(12) United States Patent
Masuda et al.

(10) Patent No.: US 11,760,072 B2
(45) Date of Patent: Sep. 19, 2023

(54) LAMINATE FILM

(71) Applicant: Toray Industries, Inc., Tokyo (JP)

(72) Inventors: Yoshihiro Masuda, Otsu (JP); Shigeru Aoyama, Otsu (JP); Jun Sakamoto, Shizuoka (JP); Hiroji Kojima, Shizuoka (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 16/650,653

(22) PCT Filed: Sep. 26, 2018

(86) PCT No.: PCT/JP2018/035626
§ 371 (c)(1),
(2) Date: Mar. 25, 2020

(87) PCT Pub. No.: WO2019/069758
PCT Pub. Date: Apr. 11, 2019

(65) Prior Publication Data
US 2020/0316927 A1 Oct. 8, 2020

(30) Foreign Application Priority Data

Oct. 3, 2017 (JP) .................................. 2017-193196
Jul. 25, 2018 (JP) .................................. 2018-139154

(51) Int. Cl.
*B32B 27/36* (2006.01)
*B32B 7/023* (2019.01)
(Continued)

(52) U.S. Cl.
CPC .............. *B32B 27/36* (2013.01); *B32B 7/023* (2019.01); *B32B 7/08* (2013.01); *B32B 2250/05* (2013.01);
(Continued)

(58) Field of Classification Search
None
See application file for complete search history.

(56) References Cited

U.S. PATENT DOCUMENTS 4,814,366 A * 3/1989 Hirahara .............. C08K 5/3417
524/285
5,089,318 A * 2/1992 Shetty .................... B32B 27/08
428/483

(Continued)

FOREIGN PATENT DOCUMENTS

EP 1099129 B1 9/2007
JP 2004249587 A 9/2004
(Continued)

OTHER PUBLICATIONS

International Search Report and Written Opinion for International Application No. PCT/JP2018/035626, dated Dec. 4, 2018, 5 pages.
(Continued)

*Primary Examiner* — Vivian Chen
(74) *Attorney, Agent, or Firm* — RATNERPRESTIA

(57) ABSTRACT

A multilayer film having a multi-layer structure unit which is a 51-layered or more multiple layer formed by alternately layering a layer (A layer) a main component of which is a polyester resin (resin A) having a dicarboxylic component and a diol component, and a layer (B layer) a main component of which is a thermoplastic resin (resin B) different from the resin A in optical properties; wherein at least one surface of the multi-layer structure unit has a refractive index of 1.68 or more and 1.80 or less, wherein the surface has a critical load of 15 mN or less at 100° C. in a scratch test, and wherein the multilayer film has at least one reflection bandwidth having a reflectance of 30% or more continuous over a wavelength width of 20 nm or more in a
(Continued)

profile of reflectance measured on at least one surface side of the multi-layer structure unit.

12 Claims, 2 Drawing Sheets

(51) Int. Cl.
  *B32B 7/08* (2019.01)
  *G02B 5/28* (2006.01)
  *G02B 5/26* (2006.01)
(52) U.S. Cl.
  CPC ..... *B32B 2250/244* (2013.01); *B32B 2250/42* (2013.01); *B32B 2307/40* (2013.01); *B32B 2307/412* (2013.01); *B32B 2307/416* (2013.01); *B32B 2307/418* (2013.01); *B32B 2307/42* (2013.01); *B32B 2307/51* (2013.01); *B32B 2307/536* (2013.01); *B32B 2307/584* (2013.01); *B32B 2367/00* (2013.01); *B32B 2457/00* (2013.01); *B32B 2551/08* (2013.01); *G02B 5/26* (2013.01); *G02B 5/28* (2013.01); *G02B 5/287* (2013.01)

(56) References Cited

U.S. PATENT DOCUMENTS

| | | | | |
|---|---|---|---|---|
| 5,103,337 A * | 4/1992 | Schrenk | ................ | G02B 1/04 359/359 |
| 5,360,659 A * | 11/1994 | Arends | ............ | B32B 17/10018 359/359 |
| 5,448,404 A * | 9/1995 | Schrenk | ................ | F21V 3/04 359/584 |
| 5,486,949 A * | 1/1996 | Schrenk | ................ | B32B 27/20 156/244.11 |
| 5,882,774 A * | 3/1999 | Jonza | ................ | G02B 5/3083 428/522 |
| 6,157,490 A * | 12/2000 | Wheatley | ............... | G02B 5/282 359/589 |
| 6,531,230 B1 * | 3/2003 | Weber | ................ | B32B 27/08 428/580 |
| 6,565,982 B1 * | 5/2003 | Ouderkirk | ........ | B32B 17/10018 428/457 |
| 6,827,886 B2 * | 12/2004 | Neavin | ................ | B29C 48/495 264/1.6 |
| 2002/0031676 A1 * | 3/2002 | Jonza | ................ | G02B 27/283 428/480 |
| 2002/0064671 A1 * | 5/2002 | Hebrink | ............... | G02B 5/0866 428/480 |
| 2003/0072931 A1 * | 4/2003 | Hebrink | ................ | B32B 7/02 428/212 |
| 2004/0032658 A1 * | 2/2004 | Fleming | ................ | B32B 27/08 359/489.15 |
| 2004/0126549 A1 | 7/2004 | Ruff et al. | | |
| 2005/0207002 A1 * | 9/2005 | Liu | ........ | G02B 5/282 359/359 |
| 2006/0084780 A1 * | 4/2006 | Hebrink | ............... | C08G 63/181 528/272 |
| 2006/0232863 A1 * | 10/2006 | Nevitt | ................ | B32B 7/023 359/586 |
| 2007/0298271 A1 * | 12/2007 | Liu | ........ | B29C 48/08 428/480 |
| 2009/0273836 A1 * | 11/2009 | Yust | ........ | B32B 27/36 359/489.04 |
| 2011/0255163 A1 | 10/2011 | Merrill et al. | | |
| 2012/0225301 A1 * | 9/2012 | Hunt | ........ | C09K 3/16 428/422 |
| 2015/0009563 A1 * | 1/2015 | Lauters | ................ | G02B 5/003 359/485.03 |
| 2016/0245965 A1 * | 8/2016 | Tai | ........ | G02B 5/305 |
| 2016/0259102 A1 | 9/2016 | Taka | | |
| 2017/0267579 A1 | 9/2017 | Lingle et al. | | |
| 2019/0369314 A1 * | 12/2019 | Hebrink | ................ | B32B 7/02 |

FOREIGN PATENT DOCUMENTS

| | | |
|---|---|---|
| JP | 2005059332 A | 3/2005 |
| JP | 2007307893 A | 11/2007 |
| JP | 2012030563 A | 2/2012 |
| JP | 2012081748 A | 4/2012 |
| WO | 2015093413 A1 | 6/2015 |

OTHER PUBLICATIONS

Extended European Search Report for European Application No. 18 864 082.5, dated Oct. 1, 2021, 11 pages.

* cited by examiner

[Fig. 1]
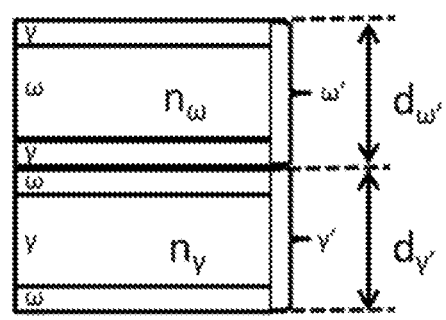

[Fig. 2]
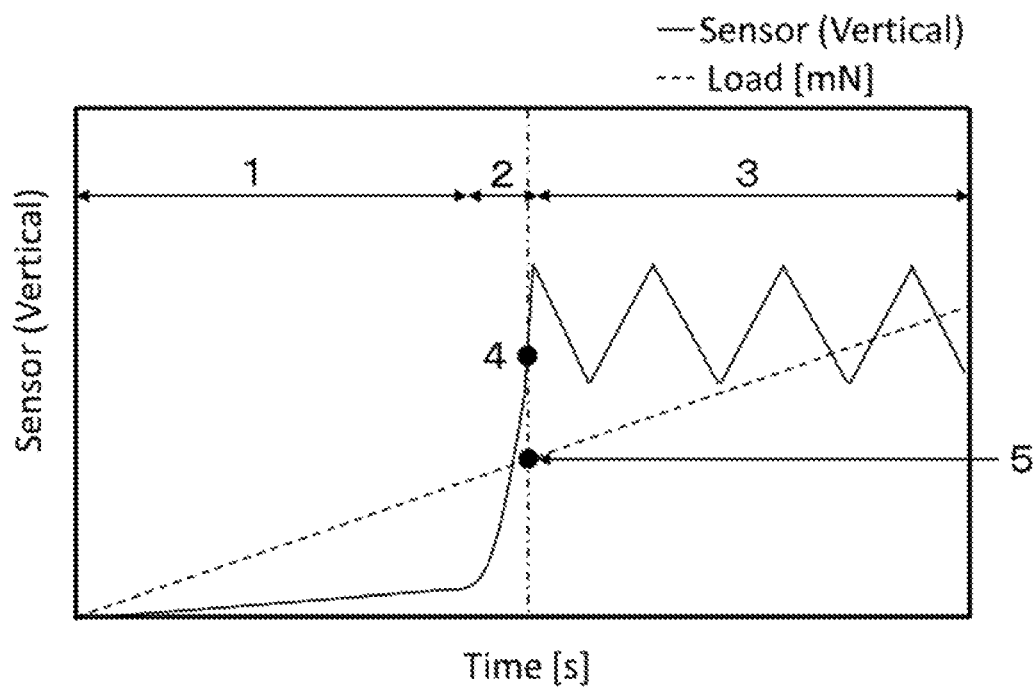

LAMINATE FILM

CROSS REFERENCE TO RELATED APPLICATIONS

This is the U.S. National Phase application of PCT/JP2018/035626, filed Sep. 26, 2018, which claims priority to Japanese Patent Application No. 2017-193196, filed Oct. 3, 2017 and Japanese Patent Application No. 2018-139154, filed Jul. 25, 2018, the disclosures of each of these applications being incorporated herein by reference in their entireties for all purposes.

FIELD OF THE INVENTION

The present invention relates to multilayer films.

BACKGROUND OF THE INVENTION

An optical interference multi-layer film is conventionally known, wherein two or more materials differing in optical properties and having a layer thickness on a light wavelength scale are alternately layered and thus enabled to produce an optical interference phenomenon, which serves to allow the optical interference multi-layer film to selectively reflect a ray of light having a specific wavelength. Such multilayer films are enabled to have various kinds of performance with desired optical designs adopted for the refractive index, number of layers, and individual layer thickness of a material to be used, and thus, are commercially available for various optical applications. Examples of such multilayer films include cold mirrors, half mirrors, laser mirrors, dichroic filters, infrared reflection films, near-infrared cut-off filters, monochromatic filters, polarizing films, and the like.

PATENT DOCUMENTS

As such a multilayer film which is obtained by a melt-extrusion method in some cases, there is a known multilayer film containing: one resin a main component of which is a polyester resin such as polyethylene terephthalate or polyethylene naphthalate; and the other resin for which a thermoplastic resin (for example, a copolyester) different from the polyester resin in optical properties is used; wherein these resins are used from the viewpoint of transparency, heat resistance, weather resistance, chemical resistance, strength, dimensional stability, and the like (Patent Documents 1 and 2). In particular, the one resin a main component of which is polyethylene naphthalate can have a larger difference in refractive index from the copolyester having a low refractive index, and thus, is useful to obtain an optical interference multi-layer film having high reflectance.
Patent Document 1: Japanese Unexamined Patent Publication (Kokai) No. 2005-059332
Patent Document 2: Japanese Unexamined Patent Publication (Kokai) No. 2004-249587

SUMMARY OF THE INVENTION

However, in a case where a melt-extrusion method is used to obtain a multilayer film composed of a layer containing polyethylene naphthalate as a main component and a layer containing a copolyester having low refractive index, the layer a main component of which is polyethylene naphthalate has high stiffness and thus, the film is difficult to deform and also difficult to use in applications where the film should be deformed and processed for use. In some cases, such a film causes, for example, breaking and cracking in a forming process, and thus, poses a problem in that the film cannot be used as an end product.

An object of the present invention is to provide a multilayer film including: a first layer a main component of which is a polyester resin having a dicarboxylic component and a diol component; and a second layer a main component of which is a thermoplastic resin different from the polyester resin in optical properties; the first layer and the second layer being alternately layered to form a 51-layered or more multiple layer, wherein the multilayer film is prevented from breaking and cracking in a forming process and has good reflectance and transparency.

To solve the above-mentioned problems, a multilayer film according to embodiments of the present invention has a structure of the following [I] or [II]: that is, [I] a multilayer film having a multi-layer structure unit which is a 51-layered or more multiple layer formed by alternately layering a layer (A layer) a main component of which is a polyester resin (resin A) having a dicarboxylic component and a diol component, and a layer (B layer) a main component of which is a thermoplastic resin (resin B) different from the resin A in optical properties; wherein at least one surface of the multi-layer structure unit has a refractive index of 1.68 or more and 1.80 or less, wherein the surface has a critical load of 15 mN or less at 100° C. in a scratch test, and wherein the multilayer film has at least one reflection bandwidth having a reflectance of 30% or more continuous over a wavelength width of 20 nm or more in a profile of reflectance measured on at least one surface side of the multi-layer structure unit; or [II] a multilayer film having a multi-layer structure unit which is a 51-layered or more multiple layer formed by alternately layering a layer (A layer) a main component of which is a polyester resin (resin A) having a dicarboxylic component and a diol component, and a layer (B layer) a main component of which is a thermoplastic resin (resin B) different from the resin A in optical properties; wherein the dicarboxylic component of the resin A contains a naphthalene dicarboxylic acid, and wherein at least one of the resins constituting the A layer and the B layer, respectively, has a structure represented by the formula (1):

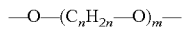
formula (1)

(wherein m and n are natural numbers so that m×n can be 5 or more).

In this regard, the multilayer film having the structure of [I] according to embodiments of the present invention has the same meaning as a multilayer film having a multi-layer structure unit which is a 51-layered or more multiple layer formed by alternately layering a layer (A layer) a main component of which is a polyester resin (resin A) having a dicarboxylic component and a diol component, and a layer (B layer) a main component of which is a thermoplastic resin (resin B) different from the resin A in optical properties; wherein at least one surface of the multi-layer structure unit has a refractive index of 1.68 or more and 1.80 or less, wherein the surface has a critical load of 15 mN or less at 100° C. in a scratch test, and wherein the multilayer film has at least one reflection bandwidth having a reflectance of 30% or more continuous over a wavelength range of 20 nm or more, the reflectance being measured on at least one surface side of the multi-layer structure unit.

For a multilayer film having the structure of [I] according to the present invention, it is preferable that the profile of reflectance is measured over the wavelength region of 900 to 1,400 nm. In this regard, this preferable aspect has the same meaning that the multilayer film has at least one such reflection bandwidth in the wavelength range of 900 to 1,400 nm.

In a multilayer film having the structure of [I] according to embodiments of the present invention, the multi-layer structure unit has a peak value of loss tangent (tan δ), determined by dynamic viscoelasticity measurement, of 120° C. or less.

For a multilayer film having the structure of [I] according to the present invention, it is preferable that at least one of the resins constituting the A layer and the B layer, respectively, has a structure represented by the formula (1):

    formula (1)

(wherein m and n are natural numbers so that m×n can be 5 or more).

For a multilayer film having the structure of [I] according to the present invention, it is preferable that the resin B is a polyester resin having a dicarboxylic component and a diol component.

For a multilayer film having the structure of [I] according to the present invention, it is preferable that the resin B is a polyester resin having a dicarboxylic component and a diol component, and that at least one of the resin A and the resin B contains, as a diol component, a structure represented by the formula (1):

    formula (1)

(wherein m and n are natural numbers so that m×n can be 5 or more).

For a multilayer film having the structure of [I] according to the present invention, it is preferable that the resin B is a polyester resin having a dicarboxylic component and a diol component, and that at least one of the resin A and the resin B contains, as a diol component, a structure represented by the formula (1) in an amount of 0.5 mol % or more and 40 mol % or less with respect to all the diol components;

    formula (1)

(wherein m and n are natural numbers so that m×n can be 5 or more).

For a multilayer film having the structure of [I] according to the present invention, it is preferable that the resin A contains, as a diol component, a structure represented by the formula (1) in an amount of 0.5 mol % or more and 40 mol % or less with respect to all the diol components of the resin A;

    formula (1)

(wherein m and n are natural numbers so that m×n can be 5 or more).

For a multilayer film having the structure of [I] according to the present invention, it is preferable that the A layer is arranged as at least one surface layer of the multi-layer structure unit.

For a multilayer film having the structure of [I] according to the present invention, it is preferable that the multi-layer structure unit has a multi-layer unit 1 and a multi-layer unit 2; wherein the multi-layer unit 1 is formed by alternately layering a layer (α layer) a main component of which is a polyester resin α having a dicarboxylic component and a diol component, and a layer (β layer) a main component of which is a thermoplastic resin β different from the resin α in optical properties, and the multi-layer unit 1 satisfies the following (i); wherein the multi-layer unit 2 is formed by alternately layering a layer (γ layer) a main component of which is a polyester resin γ having a dicarboxylic component and a diol component, and a layer (ω layer) a main component of which is a thermoplastic resin ω different from the resin γ in optical properties, and the multi-layer unit 2 satisfies the following (ii).

(i) Any α layer and a β layer located adjacent to each other have a thickness ratio (thickness of α layer/thickness of β layer) of 0.7 or more and 1.4 or less.

(ii) Compared to the thinnest layer (having a thickness ratio of 1) of three layers located adjacent to each other, one of the other two layers has a thickness ratio of 1.0 or more and 1.4 or less whereas the remaining layer has a thickness ratio of 5 or more and 9 or less.

For a multilayer film having the structure of [II] according to the present invention, it is preferable that the resin B is a polyester resin having a dicarboxylic component and a diol component.

For a multilayer film having the structure of [II] according to the present invention, it is preferable that the resin B is a polyester resin having a dicarboxylic component and a diol component, and that at least one of the resin A and the resin B contains, as a diol component, a structure represented by the formula (1):

    formula (1)

(wherein m and n are natural numbers so that m×n can be 5 or more).

For a multilayer film having the structure of [II] according to the present invention, it is preferable that the resin B is a polyester resin having a dicarboxylic component and a diol component, and that at least one of the resin A and the resin B contains a structure represented by the formula (1) in an amount of 0.5 mol % or more and 40 mol % or less with respect to all the diol components;

    formula (1)

(wherein m and n are natural numbers so that m×n can be 5 or more).

For a multilayer film having the structure of [II] according to the present invention, it is preferable that the resin A contains, as a diol component, a structure represented by the formula (1) in an amount of 0.5 mol % or more and 40 mol % or less with respect to all the diol components of the resin A;

    formula (1)

(wherein m and n are natural numbers so that m×n can be 5 or more).

For a multilayer film having the structure of [II] according to the present invention, it is preferable that the A layer is arranged as at least one surface layer of the multi-layer structure unit.

For a multilayer film having the structure of [II] according to the present invention, it is preferable that the multilayer film has at least one reflection bandwidth having a reflectance of 30% or more continuous over a width of 20 nm or more, the reflectance being measured on at least one surface side of the multi-layer structure unit, and that at least one surface of the multi-layer structure unit has a refractive index of 1.68 or more and 1.80 or less.

For a multilayer film having the structure of [II] according to the present invention, it is preferable that the multilayer film has at least one reflection bandwidth having a reflectance of 30% or more continuous over a wavelength width of 20 nm or more in a profile of reflectance measured on at least one surface side of the multi-layer structure unit, and that the profile of reflectance is measured over the wavelength region of 900 to 1,400 nm. In this regard, this preferable aspect means the same thing as that the multilayer film has at least one reflection bandwidth having a reflectance of 30% or more continuous over a wavelength range of 20 nm or more, the reflectance being measured on at least one surface side of the multi-layer structure unit, and that the multilayer film has at least one such reflection bandwidth in the wavelength range of 900 to 1,400 nm.

For a multilayer film having the structure of [II] according to the present invention, it is preferable that the multi-layer structure unit has a peak value of loss tangent (tan $\delta$), determined by dynamic viscoelasticity measurement, of 120° C. or less.

For a multilayer film having the structure of [II] according to the present invention, it is preferable that the multi-layer structure unit has a multi-layer unit 1 and a multi-layer unit 2; wherein the multi-layer unit 1 is formed by alternately layering a layer ($\alpha$ layer) a main component of which is a polyester resin $\alpha$ having a dicarboxylic component and a diol component, and a layer ($\beta$ layer) a main component of which is a thermoplastic resin $\beta$ different from the resin $\alpha$ in optical properties, and the multi-layer unit 1 satisfies the following (i); wherein the multi-layer unit 2 is formed by alternately layering a layer ($\gamma$ layer) a main component of which is a polyester resin $\gamma$ having a dicarboxylic component and a diol component, and a layer ($\omega$ layer) a main component of which is a thermoplastic resin $\omega$ different from the resin $\gamma$ in optical properties, and the multi-layer unit 2 satisfies the following (ii).

(i) Any $\alpha$ layer and a $\beta$ layer located adjacent to each other have a thickness ratio (thickness of $\alpha$ layer/thickness of $\beta$ layer) of 0.7 or more and 1.4 or less.

(ii) Compared to the thinnest layer (having a thickness ratio of 1) of three layers located adjacent to each other, one of the other two layers has a thickness ratio of 1.0 or more and 1.4 or less whereas the remaining layer has a thickness ratio of 5 or more and 9 or less.

The present invention makes it possible to obtain a multilayer film which is prevented from breaking and cracking in a forming process and has good reflectance and transparency. The multilayer film can be used as an optical interference multi-layer film in wide-ranging applications.

BRIEF DESCRIPTION OF DRAWINGS

FIG. 1 is a conceptual scheme depicting the structure of a multi-layer unit 2.

FIG. 2 is a diagram depicting an example of measurement result in a scratch test and a method of determining a critical load.

DETAILED DESCRIPTION OF EMBODIMENTS OF THE INVENTION

Preferred embodiments of the present invention will be illustrated below, but it should be understood that the present invention is not construed as being limited to these embodiments including the Examples given below and, as a matter of course, various changes may be made as long as meeting any object of the present invention and unless going beyond the scope of the claims of the present invention. For simplicity of explanation, some of the description is given, taking, as an example, a multilayer film formed by alternately layering two kinds of polyester resins differing in optical properties, and the use of three or more kinds of polyester resins and the use of a thermoplastic resin other than a polyester resin should be understood in the same manner.

A multilayer film according to embodiments of the present invention is a multilayer film having a layer (A layer) a main component of which is a polyester resin (resin A) having a dicarboxylic component and a diol component. A polyester resin is generally less expensive than a thermosetting resin and a photo-curing resin, can be formed into a sheet continuously and conveniently using a known melt-extrusion method, and thus makes it possible to obtain a multilayer film at low cost.

In a multilayer film according to embodiments of the present invention, the resin A and the resin B should be polyester resins different in optical properties. As used herein, being different in optical properties means that the refractive index differs by 0.01 or more between any two of the following directions: any two arbitrarily selected in-plane directions that are perpendicular to each other and the direction perpendicular to the plane. In addition, the resin A and the resin B preferably have different melting points or crystallization temperatures. Having different melting points or crystallization temperatures refers to differing by 3° C. or more in the melting point or crystallization temperature determined by the below-mentioned measurement method. In this regard, having different melting points or crystallization temperatures also means that one resin has a melting point, whereas the other resin has no melting point, and that one resin has a crystallization temperature, whereas the other resin has no crystallization temperature. It is more preferable to have different melting points and different crystallization temperatures.

In addition, a multilayer film according to embodiments of the present invention should be a 51-layered or more multiple layer formed by alternately layering the A layer and the B layer. As used herein, being formed by alternately layering means that the A layer and the B layer are layered in the thickness direction in a regular manner, for example, layered in a regular manner such as A(BA)n (n denotes a natural number). If layers of different resins differing in optical properties are layered alternately, it will be possible to allow them to reflect light in a specific wavelength range specified by adopting an appropriate relationship among differences in refractive index between these layers and the thicknesses of the layers. Furthermore, as the number of layers increases, it will be possible to achieve a high reflectance over a wider bandwidth. The number of layers is preferably 101 or more, more preferably 201 or more. The interference reflection described above serves to achieve a high reflectance over a wider wavelength bandwidth with an increasing number of layers, making it possible to produce a multilayer film having a higher light shielding performance. Although there are no specific upper limit to the number of layers, deterioration in handleability occurs due to an increase in film thickness and an increase in production cost that results from production equipment that becomes larger with an increasing number of layers, and realistically therefore, the practical upper limit is 1,000 for each layer type. In this regard, a multi-layer structure unit in embodiments of the present invention refers to a structure unit which is a 51-layered or more multiple layer in which the A layer and the B layer are layered alternately, and the surface layer of the multi-layer structure unit is necessarily the A layer or the B layer.

An aspect of a multilayer film according to embodiments of the present invention is, for example, a multilayer film having at least one reflection bandwidth having a reflectance of 30% or more continuous over a wavelength width of 20 nm or more in a profile of reflectance measured on at least one surface side. It is more preferable to have at least one reflection bandwidth having a reflectance of 30% or more continuous over a wavelength width of 100 nm or more in a profile of reflectance, it is still more preferable to have at least one reflection bandwidth having a reflectance of 30% or more continuous over a wavelength width of 300 nm or more in a profile of reflectance, and it is particularly preferable to have at least one reflection bandwidth having a reflectance of 30% or more continuous over a wavelength width of 500 nm or more in a profile of reflectance. In addition, it is more preferable to have a reflection bandwidth having a reflectance of 60% or more continuous over a wavelength width of 20 nm or more in a profile of reflectance, and it is still more preferable to have at least one reflection bandwidth having a reflectance of 70% or more continuous over a wavelength width of nm or more in a profile of reflectance. For example, a multilayer film is enabled to have both a high transparency and a high infrared ray shielding performance, wherein the multilayer film is penetrated by light in the visible light range (400 to 800 nm) and reflects light in the wavelength range of 900 to 1,200 nm (approximately 18% of the total intensity of sunlight), which is somewhat higher than the visible light range. Alternatively, obtaining a film which reflects approximately 50% of light in the visible light region (400 to 800 nm) makes it possible that such a film is used in various applications, for example, used as a half mirror. Such a film can be obtained by using two or more resins different in optical properties that significantly differ in in-plane refractive index, and in the case of using biaxially stretched films, it is thus preferable to use a multilayer film formed by alternately layering layers a main component of which is a polyester resin, which is crystalline, and layers a main component of which is a thermoplastic resin (a copolyester with a low refractive index is preferably used) that maintains a noncrystalline state while being stretched or that is melted in the heat-treating step. In addition, it is more preferable that the profile of reflectance measured in the wavelength region of 900 to 1,400 nm has at least one reflection bandwidth having a reflectance of 30% or more continuous over a wavelength width of 20 nm or more. The major part of the intensity distribution of sunlight is within the visible light region, and the intensity distribution tends to decrease with an increasing wavelength. However, to use a film in applications where high transparency is required, light in the wavelength range of 900 to 1,400 nm, which is somewhat higher than the visible light range, should be reflected efficiently to allow the film to have high infrared ray shielding performance. It is more preferable that the profile of reflectance measured in the wavelength region of 900 to 1,400 nm has at least one reflection bandwidth having a reflectance of 30% or more continuous over a wavelength width of 100 nm or more, and it is still more preferable that the profile of reflectance measured in the wavelength region of 900 to 1,400 nm has at least one reflection bandwidth having a reflectance of 30% or more continuous over a wavelength width of 200 nm or more. In addition, it is more preferable that the average reflectance is 50% or more as measured in the wavelength region of 900 to 1,400 nm, and it is still more preferable that the average reflectance is 70% or more as measured in the wavelength region of 900 to 1,400 nm. The larger the average reflectance measured in the wavelength region of 900 to 1,400 nm is, the higher infrared ray shielding performance can be afforded. In addition, allowing the average reflectance measured in the wavelength region of 400 to 800 nm to be preferably 20% or less, more preferably 15% or less, makes it possible to produce a film which reduces reflection in the visible light range and has a high infrared ray shielding performance to eliminate coloring and glittering. Such a film can be obtained by using two or more resins different in optical properties that significantly differ in in-plane refractive index, and in the case of using biaxially stretched films, it is thus possible to use a multilayer film formed by alternately layering layers a main component of which is a polyester resin, which is crystalline, and layers a main component of which is a thermoplastic resin that maintains a noncrystalline state while being stretched or that is melted in the heat-treating step.

A preferable structure for having the above-mentioned reflection bandwidth is, for example, the following aspect. That is, the structure has a multi-layer unit 1 and a multi-layer unit 2; wherein the multi-layer unit 1 is formed by alternately layering a layer (α layer) a main component of which is a polyester resin α having a dicarboxylic component and a diol component, and a layer (β layer) a main component of which is a thermoplastic resin β different from the resin α in optical properties, and the multi-layer unit 1 satisfies the following (i); wherein the multi-layer unit 2 is formed by alternately layering a layer (γ layer) a main component of which is a polyester resin γ and a layer (ω layer) a main component of which is a thermoplastic resin ω different from the resin γ in optical properties, and the multi-layer unit 2 satisfies the following (ii).

(i) Any α layer and a β layer located adjacent to each other have a thickness ratio (thickness of α layer/thickness of β layer) of 0.7 or more and 1.4 or less.

(ii) Compared to the thinnest layer (having a thickness ratio of 1) of three layers located adjacent to each other, one of the other two layers has a thickness ratio of 1.0 or more and 1.4 or less whereas the remaining layer has a thickness ratio of 5 or more and 9 or less.

Here, it is preferable that the polyester resin α and the polyester resin γ are resins of the same type and that the thermoplastic resin β and the thermoplastic resin ω are resins of the same type. Otherwise, it is necessary either that the thermoplastic resins α and γ are of the same type or that the thermoplastic resins β and ω are of the same type.

Here, for the above-mentioned multi-layer unit 1, the optical thicknesses of the mutually adjacent A layer and B layer preferably satisfy both the equations (1) and (2) given below:

[Math. 1]

$$\lambda/m = 2(n_\alpha d_\alpha + n_\beta d_\beta) \quad (1)$$

[Math. 2]

$$n_\alpha d_\alpha = n_\beta d_\beta \quad (2)$$

Here, λ, is the reflection wavelength, $n_\alpha$ is the in-plane refractive index of the α layer; $d_\alpha$ is the thickness of the α layer; $n_\beta$ is the in-plane refractive index of the β layer, $d_\beta$ is the thickness of the β layer, and m is a natural number showing the order. A layer thickness distribution that satisfies both equations (1) and (2) serves to eliminate reflections of even-numbered orders. Accordingly, the average reflectance in the wavelength range of 400 to 800 nm, which is included in the visible light range, can be decreased while maintaining a high average reflectance in the wavelength range of 900 nm to 1,200 nm, making it possible to produce a film having both a required transparency and a high infrared ray shielding performance. In general, a film of thermoplastic resin that is formed and stretched has a refractive index of about 1.4 to 1.9, and accordingly, a film in which reflections of even-numbered orders are reduced can be obtained by adjusting the thickness ratio between mutually adjacent A layer and B layer (thickness of A layer/thickness of B layer) to 0.7 or more and 1.4 or less. Therefore, it is preferable for mutually adjacent A layer and B layer to have a thickness ratio (thickness of A layer/thickness of B layer) of 0.7 or more and 1.4 or less. It is more preferably 0.8 or more and 1.2 or less.

In the case of aforementioned multi-layer unit 2, compared to the thinnest layer (having a thickness ratio of 1) of three layers located adjacent to each other in multi-layer unit 2, it is preferable that one of the other two layers has a thickness ratio of 1.0 or more and 1.4 or less whereas the remaining layer has a thickness ratio of 5 or more and 9 or less. The above structure is based on the 711 structure set forth in the specification of U.S. Pat. No. 5,360,659. This structure provides a method in which a layer is sandwiched between other layers that differ from the former in optical properties and have thicknesses of about 1/7 of the former to form a multi-layer that can be deemed to be a single layer serving to reduce not only the second order reflection but also the third order reflection. Compared to the thinnest layer (having a thickness ratio of 1) of any set of three layers located adjacent to each other, it is preferable that the thickest layer has a thickness ratio of 5 to 9, more preferably 6 to 8, and the remaining layer has a thickness ratio of 1.0 to 1.4, more preferably 1.0 to 1.2. A value in this range serves to produce a film in which second and third order reflections are eliminated in the visible light range (wavelength range of 400 to 800 nm), assuming a reflection bandwidth covering 1,200 nm or more. In the case of these layer thicknesses, the first to third layers from the top are deemed to form the ω' layer and the forth to sixth layers are deemed to form the γ' layer as illustrated in FIG. 1. For the above-mentioned multi-layer unit 2, the optical thicknesses of the mutually adjacent ω layer and γ layer preferably satisfy both equations (3) and (4) given below:

[Math. 3]

$$\lambda/m = 2(n_\gamma d_\gamma + n_\omega d_\omega') \quad (3)$$

[Math. 4]

$$n_\gamma d_\gamma = n_\omega d_\omega' \quad (4)$$

Here, λ is the reflection wavelength, $n_\gamma$ is the in-plane refractive index of the γ layer; $d_\gamma$ is the thickness of the γ layer; $n_\omega$ is the in-plane refractive index of the ω layer, $d_\omega$ is the thickness of the ω layer, and m is a natural number showing the order.

In a case where a multilayer film according to the present invention has the multi-layer unit 1 and the multi-layer unit 2, the multi-layer unit 1 and the multi-layer unit 2 preferably have, therebetween, a thick film layer (a thick intermediate film layer) 0.5 μm or more and 10 μm or less in thickness. Providing the thick film layer between the multi-layer unit 1 and the multi-layer unit 2 makes it possible to form a multi-layer so that particularly the thickness of a layer in the vicinity of the thick intermediate film layer can be accurate.

In a multilayer film according to the present invention, the thickness of the layer arranged as the surface layer is preferably 1% or more and 20% or less with respect to the whole multilayer thickness. Allowing the layer arranged as the surface layer to have a thickness in this range makes it possible to form a multi-layer so that particular the thickness of a layer in the vicinity of the surface layer can be accurate, and makes it easy to control reflectance and transmittance.

In a multilayer film according to embodiments of the present invention, the resin B is composed of a thermoplastic resin different from the resin A in optical properties. Examples of thermoplastic resins different from the resin A in optical properties include polyester resins, acrylic resins, polycarbonate resins, and the like. Among these, polyester resins having a dicarboxylic component and a diol component are preferable.

Examples of dicarboxylic components of polyester resins used for the resin A and the resin B and having a dicarboxylic component and a diol component in a multilayer film according to embodiments of the present invention include terephthalic acid, isophthalic acid, phthalic acid, naphthalenedicarboxylic acid (1,4-naphthalenedicarboxylic acid, 1,5-naphthalenedicarboxylic acid, 2,6-naphthalenedicarboxylic acid, 2,3-naphthalenedicarboxylic acid), 4,4'-diphenyldicarboxylic acid, 4,4'-diphenylsulfonedicarboxylic acid, adipic acid, sebacic acid, dimer acid, cyclohexanedicarboxylic acid, ester-forming derivatives thereof, and the like. In addition, examples of diol components include ethylene glycol, 1,2-propanediol, 1,3-butanediol, 1,4-butanediol, 1,5-pentadiol, diethylene glycol, polyalkylene glycol, 2,2-bis(4'-β-hydroxyethoxyphenyl)propane, isosorbate, 1,4-cyclohexanedimethanol, spiroglycol, neopentyl glycol, polyethylene glycol, polypropylene glycol, polybutylene glycol, triethylene glycol, tetraethylene glycol, polytetramethyleneether glycol, ester-forming derivatives thereof, and the like. Preferable examples of dicarboxylic components include terephthalic acid, 2,6-naphthalenedicarboxylic acid, and isophthalic acid, and preferable examples of diol components include ethylene glycol, 1,4-cyclohexanedimethanol, polyalkylene glycol, polyethylene glycol, tetraethylene glycol, and polytetramethyleneether glycol.

In a multilayer film having the structure of [I] according to embodiments of the present invention, at least one surface of the multi-layer structure unit has a refractive index of 1.68 or more and 1.80 or less. In a case where the refractive index is less than 1.68, it is difficult to have a reflection bandwidth having a reflectance of 30% or more. In a case where the refractive index is more than 1.80, the resin A and the resin B are not well layered, causing the film to be cloudy and generating noticeable interfacial peeling between the A layer and the B layer. Examples of methods of solving this include allowing the dicarboxylic components in the resin A to include naphthalenedicarboxylic acid. Achieving such a structure makes it possible to effect a difference in refractive index between the A layer and the B layer, and makes it easier to obtain an optical interference multi-layer film having more excellent reflective performance. In addition, the resin B is preferably a noncrystalline resin to increase the difference in refractive index between the A layer and the B layer. In this regard, a multilayer film according to embodiments of the present invention has a layer (A layer) a main component of which is a resin A and a layer (B layer) a main component of which is a resin B, and a main component as used herein refers to a component the percentage of which is more than 50 wt % of the components included in each layer. As a method of allowing a naphthalenedicarboxylic acid to be included in the dicarboxylic components of the resin A of a multilayer film according to the present invention, a preferable method can be enumerated, in which a naphthalenedicarboxylic acid is included in the dicarboxylic components of the raw material polyester resin to be included in the resin A.

For a multilayer film according to the present invention, the A layer and the B layer preferably have a difference of 0.05 or more in average in-plane refractive index. The difference is more preferably 0.12 or more, still more preferably 0.14 or more and 0.35 or less. In some of the cases where the difference in average in-plane refractive index is less than 0.05, it is difficult to have a reflection bandwidth having a reflectance of 30% or more. In an example of a method of solving this, the polyester resin A is crystalline, and in addition, the thermoplastic resin B is a noncrystalline thermoplastic resin or a mixture of a noncrystalline thermoplastic resin and a crystalline thermoplastic resin. In this case, the difference in refractive index can be made easily in a stretching and heat-treating step in a film production process. In a case where the difference in average in-plane refractive index is more than 0.35, the multilayer-formation properties of the resin are degraded, making the multilayer-formation itself difficult, and the film results in having lower heat resistance and handleability.

For a multilayer film according to the present invention, it is also preferable that the multi-layer structure unit has a peak value of loss tangent (tan δ), determined by dynamic viscoelasticity measurement, of 120° C. or less. It is more preferably 70° C. or more and 110° C. or less, still more preferably 80° C. or more and 100° C. or less. In general, a resin having a lower refractive index has a lower glass transition temperature. Because of this, trying to increase the refractive index difference between the A layer and the B layer included in the multi-layer structure unit causes a divergence in glass transition temperature between the resin A and the resin B, causes a discrepancy in stretching behavior between the A layer and the B layer when the film is stretched, and thus, makes it more likely that a difference in orientation between the A layer and the B layer causes peeling therebetween. A peak value of loss tangent (tan δ), determined by dynamic viscoelasticity measurement, is a parameter which varies under the influence of the glass transition temperature of a resin included in the multilayer film. As this value, a lower value means that the glass transition temperature of one of the resins A and B which has a higher refractive index is lower, and a higher value means that the glass transition temperature of one of the resins A and B which has a higher refractive index is higher. The peak value of loss tangent (tan δ) in the above-mentioned range is preferable because, while the refractive index difference between the resin A and the resin B is brought in a suitable range, the glass transition temperature difference can be controlled to the degree to which interfacial peeling is more difficult to cause between the layers.

In a multilayer film having the structure of [I] according to embodiments of the present invention, at least one surface of the multi-layer structure unit has a critical load of 15 mN or less at 100° C. in a scratch test. It is more preferably 13 mN or less, still more preferably 11 mN or less. A scratch test refers to a test in which measurement is carried out in the below-mentioned method, and can determine a critical load that is an index representing the hardness of a surface. A critical load refers to a value of load which is applied to the surface of a test piece in a scratch test method and then causes the surface to be broken. The present inventors have vigorously studied and discovered that breaking and cracking caused to a multilayer film in a forming process depend on the hardness of the surface of the film in a heated state. That is, in a case where at least one surface of the multi-layer structure unit has a critical load of more than 15 mN at 100° C. in a scratch test, the film lacks flexibility and cannot be prevented from breaking and cracking in a forming process. On the other hand, in a case where the critical load at 100° C. in a scratch test is too low, the surface becomes too soft and more likely to cause breaking, and thus, the critical load is preferably 2 mN or more, more preferably 6 mN or more.

Without particular limitation, examples of methods of allowing at least one surface of the multi-layer structure unit to have a critical load in the above-mentioned range at 100° C. in a scratch test include allowing the resin A or the resin B to be copolymerized with and/or contain a component having low crystallinity. In one example, polyethylene naphthalate (PEN), which is most versatilely used as a polyester containing a naphthalenedicarboxylic acid as a dicarboxylic component, has a glass transition temperature of approximately 120° C., and allowing PEN to be copolymerized with and/or contain a component having lower crystallinity than PEN makes it possible to decrease the glass transition temperature and to control the critical load at 100° C. in a scratch test. The component having low crystallinity may be, without particular limitation, a component having lower crystallinity than a resin working as a main component, and is preferably a compound containing a structure represented by the following formula (1):

$$—O—(C_nH_{2n}—O)_m—\qquad\text{formula (1)}$$

(wherein m and n are natural numbers so that m×n can be 5 or more).

Here, m×n is preferably 6 or more, more preferably 8 or more. Specific examples of compounds having a structure represented by the formula (1) include polyethylene glycol, tetraethylene glycol, polytetramethyleneether glycol, triethylene glycol, dipropylene glycol, tripropylene glycol, tetrapropylene glycol, tributylene glycol, tetrabutylene glycol, and the like. In a case where a compound having a structure represented by the formula (1) is contained in a layer a main component of which is a polyester resin, the compound is preferably contained in an amount of 0.5 mol % or more and 40 mol % or less with respect to all the diol components of the polyester resin. It is more preferably 2 mol % or more and 30 mol % or less, still more preferably 4 mol % or more and 20 mol % or less. Allowing a compound having a structure represented by the formula (1) to be contained in the above-mentioned range makes it easier for at least one surface of the multi-layer structure unit to have a critical load in a suitable range at 100° C. in a scratch test, and enables the multilayer film to have a reflectance in a suitable range. Adopting such a structure makes it possible to decrease the glass transition temperature even if a polyester resin used contains, as a dicarboxylic component, a naphthalenedicarboxylic acid, which has a high refractive index and thus is preferably used for an optical interference multi-layer film. This results in making it possible to control the critical load in the above-mentioned range at 100° C. in a scratch test with the high refractive index maintained. In a case where the structure represented by the formula (1) is contained in a layer a main component of which is a polyester resin, allowing the structure represented by the formula (1) to be contained as a diol component makes it possible to prevent the structure from flowing out of the film system through transpiration and sublimation, and thus, is preferable.

In a multilayer film having the structure of [II] according to embodiments of the present invention, at least one of the resins included in the A layer and the B layer has a structure represented by the formula (1):

$$—O—(C_nH_{2n}—O)_m—\qquad\text{formula (1)}$$

(wherein m and n are natural numbers so that m×n can be 5 or more).

Allowing neither resin to contain a structure represented by the formula (1) makes it difficult to control the critical load of at least one surface of the multi-layer structure unit to 15 Nm or less at 100° C. in a scratch test.

From the viewpoint of making it easy to control the critical load of at least one surface of the multi-layer structure unit, it is preferable to arrange the A layer as the surface of the multi-layer structure unit, wherein the A layer contains, as a main component, the resin A which contains a naphthalenedicarboxylic acid among the dicarboxylic components and has a structure represented by the formula (1).

A multilayer film according to the present invention preferably has a melting calorie of 5 J/g or more as determined by differential scanning calorimetry. It is more preferably 10 J/g or more, still more preferably 20 J/g or more. Having such a structure enables the multilayer film to be composed of a resin having high crystalline, and enables the refractive index difference between the A layer and the B layer to be higher. To produce such a multilayer film, it is preferable to allow one of the resin A and the resin B which has a higher refractive index to have higher crystalline, and it is preferable to allow particularly a resin containing a larger amount of naphthalene dicarboxylic acid to have a melting calorie of 5 J/g or more.

A multilayer film according to the present invention preferably has an internal haze of 3.0% or less. An internal haze is an index which represents the haze (turbidity) of the inside of a film, excluding light scattering on the surface of the film. Having a low internal haze enables the multilayer film to be transparent and reflect light having a specific wavelength, and to be widely used in applications in which transparency is needed, such as half mirrors and infrared reflection films. The internal haze is more preferably 1.0% or less, still more preferably 0.5% or less. An internal haze in the above-mentioned range can be achieved by adjusting the kinds and amounts of the components other than the resin A in the A layer, and adjusting the kinds and amounts of the components other than the resin B in the B layer. Such a structure affords excellent compatibility and dispersibility with the resins and thus enables the internal haze to be smaller. An example of a combination of resins for satisfying the above-mentioned conditions is a combination of the resin A and the resin B, wherein the resin A is a polyethylene naphthalate resin copolymerized with polyethylene glycol, and the resin B is a polyethylene terephthalate resin copolymerized with a cyclohexane dimethanol.

If a polyethylene naphthalate containing a naphthalene dicarboxylic acid among the dicarboxylic components is used as the resin A for the purpose of causing a refractive index difference between the A layer and the B layer, the resulting film will cause breaking and cracking in a forming process because the above-mentioned critical load at 100° C. in scratch test becomes high owing to polyethylene naphthalate having a glass transition temperature of approximately 120° C. The present inventors have experimented in adding a copolymerization component to polyethylene naphthalate to decrease the glass transition temperature, but discovered that a significant effect of decreasing the glass transition temperature cannot be obtained by using an aromatic-ring-containing component such as paraxylene glycol or an isophthalic acid, or by using an ether glycol component having a small carbon number, such as butanediol or diethylene glycol. Because of this, the amount of copolymerization needs to be increased in order to decrease the glass transition temperature of polyethylene naphthalate by adding, as a copolymerization component, an aromatic-ring-containing component or an ether glycol component having a small carbon number. As a result, the refractive index is decreased, and the reflectance of the multilayer film is decreased. The copolymerization with a component represented by the above-mentioned formula (1) enables the glass transition temperature to be decreased with the high refractive index of the resin A maintained.

For a multilayer film according to the present invention, it is preferable that the resin A included in the multi-layer structure unit is a crystalline polyester resin, and also that the resin B is a noncrystalline polyester resin. Crystallinity as used herein refers to having a melting calorie of 5 J/g or more as determined by differential scanning calorimetry (DSC). Noncrystallinity refers to having a melting calorie of less than 5 J/g as determined in the same manner. Undergoing orientational crystallization in a stretching and heat-treating step enables a crystalline polyester resin to have a higher in-plane refractive index than the resin has when in a noncrystalline state before stretching. On the other hand, a noncrystalline polyester resin is heat-treated at a temperature far above the glass transition temperature in a heat-treating step so that some orientation caused in a stretching step can be completely mitigated, and that the resin in a noncrystalline state can maintain a low refractive index. In this manner, it is possible that a refractive index difference can be easily made between the crystalline polyester resin and the noncrystalline polyester resin in a stretching and heat-treating step in production of a film, and thus, it is possible that, as above-mentioned, the film has at least one reflection bandwidth having a reflectance of 30% or more continuous over a width of 20 nm or more.

Next, a preferable method of producing a multilayer film according to embodiments of the present invention will be described below with reference to an example in which a crystalline polyester resin is used as the resin A, and a noncrystalline polyester resin is used as the resin B. Needless to say, it should be understood that the present invention is not construed as being limited thereto. It should also be noted that the production of such a multi-layer structure suitable for the multilayer film can be achieved on the basis of the description given in paragraphs [0053] to [0063] of Japanese Unexamined Patent Publication (Kokai) No. 2007-307893.

The resin A and the resin B are prepared in the form of pellets or the like. The pellets are dried in hot air or in a vacuum, as required, and supplied to separate extruders. In each extruder, the resin is heat-melted at or above the melting point and sent through a filter etc. to remove foreign objects, modified resin components, etc., while controlling the resin extrusion at a constant rate by a gear pump. These resins are formed by a die into intended shapes and then discharged. Then, the multilayer sheet is discharged from the die, extruded onto a cooling body such as a casting drum to cool it for solidification to provide a cast film. In this process, it is preferable that wire type, tape type, needle type, or knife type electrodes are used to maintain close contact to a cooling body such as a casting drum by an electrostatic force to quench it for solidification. It is also preferable to supply air from a slit type, spot type, or plane type apparatus to maintain close contact to a cooling body such as a casting drum to quench it for solidification, or use nip rolls to maintain close contact to a cooling body to quench it for solidification.

To form a multilayer film constructed of a plurality of polyester resins, the plurality of resins are fed to two or more extruders and discharged through different flow channels to a multi-layer laminating apparatus. Useful multi-layer laminating apparatuses include multimanifold die, feedblock, and static mixer, but among others, it is preferable to use a feedblock that has at least two or more separate members each having many fine slits to ensure efficient production of films of the structure according to the present invention. In particular, the use of this type of feedblock eliminates the necessity for an extremely large apparatus, serving to prevent foreign objects from being formed as a result of heat degradation and perform high accuracy multi-layer formation even when the multi-layer contains an extremely large laminated layer numbers. In addition, the lamination accuracy in the width direction is also improved dramatically compared with the conventional techniques. It will also be possible to form a structure with any desired layer thicknesses. With the above apparatus, the thickness of each layer can be controlled by adopting appropriate slit shapes (length and width), which makes it possible to allow layers to have any desired thicknesses.

In this way, a melt multi-layer form having an intended layer structure can be formed and it is introduced to a die to provide a cast film as described above.

A cast film prepared in this way is preferably stretched biaxially. Here, stretching biaxially means stretching in both the length direction and the width direction. The stretching may be performed sequentially in the two directions or simultaneously in the two directions. Furthermore, the film may be re-stretched in the length direction and/or in the width direction.

First, described below is a case where the film is subjected to sequential biaxial stretching. Here, stretching in the length direction is performed with the aim of developing molecular orientation in the length direction of the film, and commonly, it is achieved by using rollers having different circumferential speeds. This stretching may be performed in a single stage or in multiple stages using two or more pairs of rollers. The required stretching ratio depends on the type of resin, but commonly, it is preferably 2 to 15. It is particularly preferably 2 to 7 in a case where a polyethylene naphthalate copolymerized resin is used for any one of the resins included in the multilayer film. Furthermore, the stretching temperature is preferably between the glass transition temperature of the resin included in the multilayer film and the temperature that is 100° C. above that glass transition temperature.

The uniaxially stretched film prepared in this way may be subjected to surface treatment such as corona treatment, flame treatment, and plasma treatment, followed by in-line coating to impart functions to develop lubricity, adhesiveness, antistatic property, etc., as required.

Compared to this, stretching in the width direction is intended to develop orientation in the width direction of the film. Commonly, a tenter is used to hold both ends of the film by clips and it is conveyed while stretching the film in the width direction. The required stretching ratio depends on the type of resin, but commonly, it is preferably 2 to 15. It is particularly preferably 2 to 7 in a case where a polyethylene naphthalate copolymerized resin is used for any one of the resins included in the multilayer film. Furthermore, the stretching temperature is preferably between the glass transition temperature of the resin included in the multilayer film and the temperature that is 120° C. above that glass transition temperature.

It is preferable for the film stretched biaxially in this way to be subjected to heat-treatment in the tenter at a temperature above the stretching temperature and below the melting point in order to improve the planarity and dimensional stability. Such heat-treatment serves to improve the dimensional stability of the film. After the heat-treatment, the film is cooled slowly and uniformly to room temperature and wound up. As required, relaxation processing etc. may also be performed between the heat-treatment and slow cooling.

For a multilayer film according to the present invention, it is also preferable that the heat-treatment temperature applied after stretching is equal to or less than the melting point of the polyester resin A and equal to or more than the melting point of the resin B. In this case, the polyester resin A remains in a highly oriented state, and at the same time, the orientation of the resin B is mitigated, thus making it possible to easily make a refractive index difference between these resins.

Next, described below is a case where the film is subjected to simultaneous biaxial stretching. In the case of simultaneous biaxial stretching, the film obtained above may be subjected to surface treatment such as corona treatment, flame treatment, and plasma treatment, followed by in-line coating to impart functions to develop lubricity, adhesiveness, antistatic property, etc., as required.

Then, the cast film is introduced into a simultaneous biaxial tenter and conveyed as both ends of the film are held by clips, followed by stretching it in the length direction and the width direction simultaneously and/or in stages. Useful simultaneous biaxial stretching machines include pantagraph type, screw type, drive motor type, and linear motor type ones, of which the use of a drive motor type machine or a linear motor type machine is preferable because the stretching ratio can be controlled as desired and relaxation processing can be performed at any desired place. The required stretching ratio depends on the type of resin, but commonly, it is preferably 6 to 50 in terms of area ratio. It is particularly preferably 8 to 30 in terms of area ratio in a case where a polyethylene naphthalate copolymerized resin is used for any one of the resins included in the multilayer film. In the case of simultaneous biaxial stretching, in particular, it is preferable to stretch the film in the length direction and the width direction at the same stretching ratio and at nearly the same stretching speed in order to minimize the in-plane orientation unevenness. Furthermore, the stretching temperature is preferably between the glass transition temperature of the resin included in the multilayer film and the temperature that is 120° C. above that glass transition temperature.

It is preferable for the film stretched biaxially in this way to be immediately subjected to heat-treatment in the tenter at a temperature above the stretching temperature and below the melting point in order to improve the planarity and dimensional stability. If such heat-treatment is to be performed, it is preferable to carry out relaxation processing quickly immediate before and/or immediately after the heat-treatment zone in order to depress the distribution of the main orientation axis in the width direction. After the heat-treatment, the film is cooled slowly and uniformly to room temperature and wound up.

EXAMPLES

Below, a multilayer film according to the present invention will be described with reference to Examples.

[Methods for Measurement of Properties and Methods for Evaluation of Effects]

The methods for evaluation of property values and the methods for evaluation of effects are as below-mentioned.

(1) Layer Thickness, Laminated Layer Numbers, and Multi-Layer Structure

The layer structure of the film was determined by observing a cross-sectional sample prepared with a microtome by transmission electron microscopy (TEM). More specifically, transmission electron microscope H-7100FA (manufactured by Hitachi, Ltd.) was used to observe a cross section of the film at a magnification of 10,000 to 40,000 under the condition of an accelerating voltage of 75 kV, and a cross-sectional photograph was taken and examined to determine the layer structure and the thickness of each layer. In some cases, a generally known dyeing technique that uses $RuO_4$, $OsO_4$, etc. was performed to achieve an increased contrast.

(2) Reflectance

A 5 cm×5 cm sample was cut out and examined to determine its reflectance using the basic configuration including an integrating sphere which is an accessory of a spectrophotometer, the U-4100 Spectrophotomater (manufactured by Hitachi, Ltd.). In the reflectance measurement, a relative reflectance was calculated, taking a reference value from an auxiliary white plate of aluminum oxide attached to the equipment. In the reflectance measurement, the sample was fixed behind the integrating sphere with the length of the sample pointing in the vertical direction. In the transmittance measurement, the sample was fixed in front of the integrating sphere with the length of the sample pointing in the vertical direction. The reflectance at an azimuth angle of 0 was measured under the following measuring conditions: a slit size of 2 nm (visible)/automatically controlled (infrared), a gain setting of 2, and a scanning speed of 600 nm/minute.

(3) Melting Calorie, Melting Point, Glass Transition Temperature, and Crystallization Temperature A sample having a mass of 5 g was taken and used for measurement and calculation carried out in accordance with JIS K 7122 (1987) and JIS K 7121 (1987) using a differential scanning calorimeter (DSC), Robot DSC-RDC220 (manufactured by Seiko Instruments Inc.). Measurement was carried out with the temperature raised at 5° C./minute from 25° C. to 290° C., and in this measurement, a value of integral from the baseline in the range of the melting point ±20° C. was determined, and regarded as a melting calorie. Here, the melting point was the point at which the difference from the baseline of the DSC was the largest. Here, in measurement for pellets or the like of the resin A or the resin B alone, a resin having a melting calorie of 5 J/g or more is regarded as a crystalline resin, and a resin having a melting calorie of less than 5 J/g is regarded as a noncrystalline resin.

(4) Presence of Structure Represented by Formula (1)

The presence of a structure represented by the formula (1) was checked by the following method. That is, a weight peak was identified by gas chromatograph mass analysis (GC-MS). Then, Fourier transform infrared (FT-IR) spectroscopy analysis was performed to check if there is a peak attributed to the interatomic bond expected in an assumed structure. In addition, proton nuclear magnetic resonance spectroscopy ($^1$H-NMR, $^{13}$C-NMR) analysis was carried out to determine the position of the chemical shift attributed to the positions of hydrogen atoms or carbon atoms in the structural formula and the proton absorption line area attributed to the number of hydrogen atoms. The results of these were used for determination.

(5) Internal Haze

Three (three sheets of) multilayer film samples in 5 cm square shape were prepared, and the samples were left to stand in a normal state (at 23° C. and a relative humidity of 50%) for 40 hours. The samples were each subjected to measurement in accordance with JIS K 7105 using a turbidity meter, "NDH5000" (manufactured by Nippon Denshoku Industries Co., Ltd.). In order to remove light scattering due to the roughness of the film surface, the measurement was carried out with the sample dipped in a quartz cell full of liquid paraffin. The values from the three (three sheets of) samples were averaged to give the internal haze value of the multilayer film.

(6) Critical Load at 100° C. in Scratch Test

Five (five sheets of) multilayer film samples in 3 cm square shape were prepared. The samples were each placed on the measurement stage of a scratch tester, "CSR5000" (manufactured by Rhesca Co., Ltd.), and the temperature of the heating stage was set to 100° C. Measurement was started one minute after the indication of the temperature controller reached 100° C. The measurement conditions were as follows.

Stylus: diamond stylus with a radius of 15 μm
Scratch speed: 10 μm/s
Amplitude: 50 μm
Touch detection level: 3.0 mN
Load condition: increase
Initial load: 0 mN
Maximum load: 200 mN
Increase: 3.33 mN
Time: 60 s After the measurement was finished, a critical load, Wc, (mN) was determined from the relationship between the application load and the sensor acceleration. Here, a method of determining a critical load will be described with reference to an example of measurement result in FIG. 2. The abscissa indicates the time from measurement start, and the ordinate indicates the sensor acceleration and the application load. The solid line plot indicates the sensor acceleration in the depth direction, and an increase in this value indicates that the stylus entered the film surface in the depth direction. The dashed line plot indicates load values, and the alternate long and short dash line indicates the time at which the slope of the sensor acceleration is the largest. As the application load increased after the measurement started, the stylus entered in the depth direction, and the sensor acceleration increased gradually (the region A). The surface was then broken, the sensor acceleration significantly varied accordingly as shown in the center of the diagram (the region B), the sensor moved on the broken surface, and thus, the sensor acceleration fluctuated in small steps (the region C). The value of the application load found at the point (4 in the diagram) at which the slope of the sensor acceleration in the region B was the largest was regarded as a critical load, Wc, (5 in the diagram). When the second and subsequent samples were each subjected to measurement, the tester was left to stand until the temperature controller indicated 25° C., and samples were exchanged, followed by measurement in the same manner. The average of three critical load values obtained by excluding the largest value and the smallest value from five values was regarded as the critical load. If the surface of the multi-layer structure unit did not appear in the surface of the multilayer film, the surface of the multi-layer structure unit was externally exposed by means of peeling, followed by measurement. If peeling was difficult, the film was cut using a diamond cutter to expose the surface externally, followed by measurement.

(7) Forming Processability

A film sample having a breadth of 320 mm and a length of 460 mm was cut out, preheated, and formed using a small type vacuum forming machine, Forming 300×, (manufactured by Seikosangyo Co., Ltd) equipped with a mold in tray shape having a 150 mm×210 mm opening, a 105 mm×196 mm bottom face, and a 50 mm height, under the temperature condition such that the sheet temperature in a forming process was in the range of 100° C.±2° C. One hundred formed samples were produced and each checked for generation of breaking and cracking, and the forming processability was rated as below-mentioned. "Good" or "excellent" is regarded as a favorable result.

Excellent: less than 5 samples caused breaking or cracking
Good: 5 or more and less than 10 samples caused breaking or cracking
Poor: 10 or more and less than 20 samples caused breaking or cracking
Inferior: 20 or more samples caused breaking or cracking (8) Peak Value of Loss Tangent (Tan δ)

A film sample having a breadth of 7 mm and a length of 20 mm was cut out and used for measurement under the below-mentioned measurement conditions using a dynamic viscoelastometer, "DMS6100" (manufactured by Seiko Instruments Inc.).

Raised temperature: 20° C. to 180° C.
Heating speed: 3° C./minute
Hold time: 5 minutes
Sampling: 1 second
Measurement frequency: 0.1 Hz From the obtained values of tan δ (tan D) and temperature (Temp), the temperature at which the tan δ value was largest was obtained and regarded as the peak value of loss tangent.

Example 1

A raw material polyester resin used for forming the resin A was polyethylene 2,6-naphthalate (having an intrinsic viscosity of 0.62 and a melting point of 245° C., and represented by PEN (1) in Tables) in which polyethylene glycol (having an average molecular weight of 400) ("10 or more" in Tables indicates that m×n is 10 or more in the structure of the formula (1)) was copolymerized in an amount of 6 mol % with respect to all the diol components of the resin A. A raw material polyester resin used for forming the resin B was a mixture (having a melting point of 225° C. and a glass transition temperature of 77° C., and represented by Resin (1) in Tables) obtained by mixing, at a mass ratio of 82:18, the following: a polyethylene terephthalate resin (having an intrinsic viscosity of 0.73, being a noncrystalline resin (having no melting point), and having a glass transition temperature of 79° C.) in which cyclohexane dimethanol (represented by CHDM in Tables) was copolymerized in an amount of 30 mol % with respect to all the diol components of the resin B; and polyethylene terephthalate (manufactured by Toray Industries, Inc., and having an intrinsic viscosity of 0.65, a melting point of 256° C., and a glass transition temperature of 81° C.).

The resin A and resin B thus prepared were melted separately at 280° C. in a vented twin screw extruder and then combined in a 449-layered feedblock through a gear pump and a filter to obtain a multilayer film having the following layer structure: (thick surface layer of resin A)/(multi-layer unit 1 containing a total of 149 A layers and B layers layered alternately in the thickness direction)/(thick intermediate layer of resin A)/(multi-layer unit 2 containing a total of 297 A layers and B layers layered alternately in the thickness direction)/(thick surface layer of resin A). This was done in such a manner that both surface layers of the multilayer film were the resins A. The layers were combined in the 449-layered feedblock and introduced to a T-die where they were formed into a sheet, which was then sent electrostatically onto a casting drum having a surface temperature maintained at 25° C. and quenched for solidification to produce a cast film. In this regard, the amount of discharge was adjusted in such a manner that the weight ratio of the resin A to the resin B was approximately 1:1.

The resulting cast film was heated on a group of rollers set at the glass transition temperature of the resin A plus 10° C. and then stretched 4.0 times in the vertical direction while being heated rapidly in a stretching zone with a length of 100 mm where heat was applied by a radiation heater to both surfaces of the film. Subsequently, both surfaces of this uniaxially stretched film were subjected to corona discharge treatment in air to provide a base film having a surface wetting tension of 55 mN/m, and then the treated surfaces were coated with a multi-layer-forming coating liquid consisting of (a polyester resin with a glass transition temperature of 18° C.)/(a polyester resin with a glass transition temperature of 82° C.)/silica particles with an average particle diameter of 100 nm to form a transparent, slippery, and adhesive layer.

This uniaxially stretched film was introduced to a tenter, preheated in hot air at 100° C., and then stretched at 20° C. above the glass transition temperature of the resin A 4.0 times in the horizontal direction at a uniform stretching speed. The stretched film was held in the tenter where it was heat-treated in hot air at 235° C., relaxed at that temperature by 2% in the width direction, subsequently cooled slowly at room temperature, and wound up. The resulting multilayer film had a thickness of 40 μm (thick surface layer (1 μm)/multi-layer unit 1 (20 μm)/thick intermediate layer (1 μm)/multi-layer unit 2 (17 μm)/thick surface layer (1 μm)).

The resulting multilayer film reflected light having the wavelength of 900 to 1,400 nm and had a nearly reflection-free flat reflectance distribution over the wavelength region of 400 to 800 nm in the visible light range. The multilayer film also had excellent transparency and excellent forming processability. Results are shown in Table 1.

Example 2

A multilayer film was obtained in the same manner as in Example 1 except that a 51-layered feedblock was used for forming a layered structure of (thick surface layer of resin A)/(multi-layer unit 1 containing a total of 49 A layers and B layers layered alternately in the thickness direction)/(thick surface layer of resin A). The resulting multilayer film had a thickness of 10 μm (thick surface layer (1 μm)/multi-layer unit 1 (8 μm)/thick surface layer (1 μm)).

The resulting multilayer film had a rather lower reflectance to light having a wavelength of 900 to 1,400 nm but had a nearly reflection-free flat reflectance distribution over the wavelength region of 400 to 800 nm in the visible light range. The multilayer film had excellent transparency and excellent forming processability. Results are shown in Table 1.

Example 3

A multilayer film was obtained in the same manner as in Example 1 except that a raw material polyester resin used for forming the resin A was polyethylene naphthalate (having an intrinsic viscosity of 0.62 and a melting point of 254° C., and represented by PEN (2) in Tables) in which polytetramethyleneether glycol (having an average molecular weight of 650) was copolymerized in an amount of 6 mol % with respect to all the diol components.

The resulting multilayer film reflected light having a wavelength of 900 to 1,400 nm and had a nearly reflection-free flat reflectance distribution over the wavelength region of 400 to 800 nm in the visible light range. The multilayer film had excellent transparency and excellent forming processability. Results are shown in Table 1.

Example 4

A multilayer film was obtained in the same manner as in Example 3 except that a 51-layered feedblock was used for forming a layered structure of (thick surface layer of resin A)/(multi-layer unit 1 containing a total of 49 A layers and B layers layered alternately in the thickness direction)/(thick surface layer of resin A).

The resulting multilayer film had a rather lower reflectance to light having a wavelength of 900 to 1,400 nm but had a nearly reflection-free flat reflectance distribution over the wavelength region of 400 to 800 nm in the visible light range. The multilayer film had excellent transparency and excellent forming processability. Results are shown in Table 1.

Example 5

A multilayer film was obtained in the same manner as in Example 1 except that a raw material polyester resin used for forming the resin A was polyethylene naphthalate (having an intrinsic viscosity of 0.62 and a melting point of 244° C., and represented by PEN (3) in Tables) in which triethylene glycol was copolymerized in an amount of 15 mol % with respect to all the diol components.

The resulting multilayer film reflected light having a wavelength of 900 to 1,400 nm and had a nearly reflection-free flat reflectance distribution over the wavelength region of 400 to 800 nm in the visible light range. The multilayer film had excellent transparency and excellent forming processability. Results are shown in Table 1.

Example 6

A multilayer film was obtained in the same manner as in Example 5 except that a 51-layered feedblock was used for forming a layered structure of (thick surface layer of resin A)/(multi-layer unit 1 containing a total of 49 A layers and B layers layered alternately in the thickness direction)/(thick surface layer of resin A).

The resulting multilayer film had a rather lower reflectance to light having a wavelength of 900 to 1,400 nm but had a nearly reflection-free flat reflectance distribution over the wavelength region of 400 to 800 nm in the visible light range. The multilayer film had excellent transparency and excellent adhesion. Results are shown in Table 1.

Example 7

A multilayer film was obtained in the same manner as in Example 1 except that a raw material polyester resin used for forming the resin A was polyethylene naphthalate (having an intrinsic viscosity of 0.62 and a melting point of 238° C., and represented by PEN (4) in Tables) in which tetraethylene glycol was copolymerized in an amount of 15 mol % with respect to all the diol components.

The resulting multilayer film reflected light having a wavelength of 900 to 1,400 nm and had a nearly reflection-free flat reflectance distribution over the wavelength region of 400 to 800 nm in the visible light range. The multilayer film had excellent transparency and excellent forming processability. Results are shown in Table 1.

Example 8

A multilayer film was obtained in the same manner as in Example 7 except that a 51-layered feedblock was used for forming a layered structure of (thick surface layer of resin A)/(multi-layer unit 1 containing a total of 49 A layers and B layers layered alternately in the thickness direction)/(thick surface layer of resin A).

The resulting multilayer film had a rather lower reflectance to light having a wavelength of 900 to 1,400 nm but had a nearly reflection-free flat reflectance distribution over the wavelength region of 400 to 800 nm in the visible light range. The multilayer film had excellent transparency and excellent forming processability. Results are shown in Table 1.

Example 9

A multilayer film was obtained in the same manner as in Example 1 except that a raw material polyester resin used for forming the resin A was polyethylene naphthalate (having an intrinsic viscosity of 0.62 and a melting point of 252° C., and represented by PEN (5) in Tables) in which dipropylene glycol was copolymerized in an amount of 15 mol % with respect to all the diol components.

The resulting multilayer film reflected light having a wavelength of 900 to 1,400 nm and had a nearly reflection-free flat reflectance distribution over the wavelength region of 400 to 800 nm in the visible light range. The multilayer film had excellent transparency and excellent forming processability. Results are shown in Table 1.

Example 10

A multilayer film was obtained in the same manner as in Example 9 except that a 51-layered feedblock was used for forming a layered structure of (thick surface layer of resin A)/(multi-layer unit 1 containing a total of 49 A layers and B layers layered alternately in the thickness direction)/(thick surface layer of resin A).

The resulting multilayer film had a rather lower reflectance to light having a wavelength of 900 to 1,400 nm but had a nearly reflection-free flat reflectance distribution over the wavelength region of 400 to 800 nm in the visible light range. The multilayer film had excellent transparency and excellent forming processability. Results are shown in Table 1.

Example 11

A multilayer film was obtained in the same manner as in Example 1 except that a raw material polyester resin used for forming the resin A was polyethylene naphthalate (having an intrinsic viscosity of 0.62 and a melting point of 240° C., and represented by PEN (6) in Tables) in which tripropylene glycol was copolymerized in an amount of 15 mol % with respect to all the diol components.

The resulting multilayer film reflected light having a wavelength of 900 to 1,400 nm and had a nearly reflection-free flat reflectance distribution over the wavelength region of 400 to 800 nm in the visible light range. The multilayer film had excellent transparency and excellent forming processability. Results are shown in Table 1.

Example 12

A multilayer film was obtained in the same manner as in Example 11 except that a 51-layered feedblock was used for forming a layered structure of (thick surface layer of resin A)/(multi-layer unit 1 containing a total of 49 A layers and B layers layered alternately in the thickness direction)/(thick surface layer of resin A).

The resulting multilayer film had a rather lower reflectance to light having a wavelength of 900 to 1,400 nm but had a nearly reflection-free flat reflectance distribution over the wavelength region of 400 to 800 nm in the visible light range. The multilayer film had excellent transparency and excellent forming processability. Results are shown in Table 1.

Example 13

A multilayer film was obtained in the same manner as in Example 1 except that a raw material polyester resin used for forming the resin B was a copolymerized polyethylene terephthalate (having an intrinsic viscosity of 0.72 and a glass transition temperature of 85° C., being a noncrystalline resin (having no melting point), and represented by Resin (2) in Tables) in which cyclohexanedicarboxylic acid (represented by CHDA in Tables) was copolymerized in an amount of 20 mol % with respect to all the dicarboxylic components and in which spiroglycol (represented by SPG in Tables) was copolymerized in an amount of 15 mol % with respect to all the diol components.

The resulting multilayer film reflected light having a wavelength of 900 to 1,400 nm and had a nearly reflection-free flat reflectance distribution over the wavelength region of 400 to 800 nm in the visible light range. The multilayer film had excellent transparency and excellent forming processability. Results are shown in Table 1.

Example 14

A multilayer film was obtained in the same manner as in Example 13 except that a 51-layered feedblock was used for forming a layered structure of (thick surface layer of resin A)/(multi-layer unit 1 containing a total of 49 A layers and B layers layered alternately in the thickness direction)/(thick surface layer of resin A).

The resulting multilayer film had a rather lower reflectance to light having a wavelength of 900 to 1,400 nm but had a nearly reflection-free flat reflectance distribution over the wavelength region of 400 to 800 nm in the visible light range. The multilayer film had excellent transparency and excellent forming processability. Results are shown in Table 1.

Example 15

A multilayer film was obtained in the same manner as in Example 13 except that a raw material polyester resin used for forming the resin A was polyethylene naphthalate (having an intrinsic viscosity of 0.62 and a melting point of 238° C., and represented by PEN (4) in Tables) in which tetraethylene glycol was copolymerized in an amount of 15 mol % with respect to all the diol components.

The resulting multilayer film reflected light having a wavelength of 900 to 1,400 nm and had a nearly reflection-free flat reflectance distribution over the wavelength region of 400 to 800 nm in the visible light range. The multilayer film had excellent transparency and excellent forming processability. Results are shown in Table 1.

Example 16

A multilayer film was obtained in the same manner as in Example 15 except that a 51-layered feedblock was used for forming a layered structure of (thick surface layer of resin A)/(multi-layer unit 1 containing a total of 49 A layers and B layers layered alternately in the thickness direction)/(thick surface layer of resin A).

The resulting multilayer film had a rather lower reflectance to light having a wavelength of 900 to 1,400 nm but had a nearly reflection-free flat reflectance distribution over the wavelength region of 400 to 800 nm in the visible light range. The multilayer film had excellent transparency and excellent forming processability. Results are shown in Table 1.

Example 17

A multilayer film was obtained in the same manner as in Example 2 except that a raw material polyester resin used for forming the resin A was polyethylene naphthalate (having an intrinsic viscosity of 0.62 and a melting point of 249° C., and represented by PEN (5) in Tables) in which polyethylene glycol (having an average molecular weight of 400) was copolymerized in an amount of 4 mol % with respect to all the diol components.

The resulting multilayer film reflected light having a wavelength of 900 to 1,400 nm and had a nearly reflection-free flat reflectance distribution over the wavelength region of 400 to 800 nm in the visible light range. The multilayer film had excellent transparency and excellent forming processability. Results are shown in Table 1.

Example 18

A multilayer film was obtained in the same manner as in Example 2 except that a raw material polyester resin used for forming the resin A was polyethylene naphthalate (having an intrinsic viscosity of 0.62 and a melting point of 258° C., and represented by PEN (6) in Tables) in which polyethylene glycol (having an average molecular weight of 400) was copolymerized in an amount of 1 mol % with respect to all the diol components.

The resulting multilayer film reflected light having a wavelength of 900 to 1,400 nm and had a nearly reflection-free flat reflectance distribution over the wavelength region of 400 to 800 nm in the visible light range. The multilayer film had excellent transparency and excellent forming processability. Results are shown in Table 1.

Example 19

A multilayer film was obtained in the same manner as in Example 2 except that the resin A used was polyethylene naphthalate (having an intrinsic viscosity of 0.62 and a melting point of 228° C., and represented by PEN (7) in Tables) in which polyethylene glycol (having an average molecular weight of 400) was copolymerized in an amount of 20 mol % with respect to all the diol components of the resin A, and that the resin B used was a copolymerized polyethylene terephthalate (having an intrinsic viscosity of 0.72 and a glass transition temperature of 53° C., being a noncrystalline resin (having no melting point), and represented by Resin (3) in Tables) in which polyethylene glycol (having an average molecular weight of 400) (represented by PEG400 in Tables) was copolymerized in an amount of 20 mol % with respect to all the diol components of the resin B.

The resulting multilayer film reflected light having a wavelength of 900 to 1,400 nm and had a nearly reflection-free flat reflectance distribution over the wavelength region of 400 to 800 nm in the visible light range. The multilayer film had excellent transparency and excellent forming processability. Results are shown in Table 1.

Example 20

A multilayer film was obtained in the same manner as in Example 2 except that a raw material polyester resin used for forming the resin A was polyethylene naphthalate (having an intrinsic viscosity of 0.62 and a melting point of 215° C., and represented by PEN (8) in Tables) in which polyethylene glycol (having an average molecular weight of 400) was copolymerized in an amount of 30 mol % with respect to all the diol components, and that the resin B used was a copolymerized polyethylene terephthalate (having an intrinsic viscosity of 0.72 and a glass transition temperature of 15° C., being a noncrystalline resin (having no melting point), and represented by Resin (4) in Tables) in which polyethylene glycol (having an average molecular weight of 400) was copolymerized in an amount of 50 mol % with respect to all the diol components of the resin B.

The resulting multilayer film reflected light having a wavelength of 900 to 1,400 nm and had a nearly reflection-free flat reflectance distribution over the wavelength region of 400 to 800 nm in the visible light range. The multilayer film had excellent transparency and excellent forming processability. Results are shown in Table 1.

Comparative Example 1

A multilayer film was obtained in the same manner as in Example 2 except that a raw material polyester resin used for forming the resin A was polyethylene naphthalate (having an intrinsic viscosity of 0.62 and a melting point of 260° C., and represented by PEN (9) in Tables) in which tetraethylene glycol was copolymerized in an amount of 4 mol % with respect to all the diol components.

The resulting multilayer film reflected light having a wavelength of 900 to 1,400 nm and had a nearly reflection-free flat reflectance distribution over the wavelength region of 400 to 800 nm in the visible light range. The multilayer film had excellent transparency and excellent forming processability. Results are shown in Table 1.

Comparative Example 2

A multilayer film was obtained in the same manner as in Example 2 except that a raw material polyester resin used for forming the resin A was polyethylene naphthalate (having an intrinsic viscosity of 0.62 and a melting point of 264° C., and represented by PEN (10) in Tables) in which tetraethylene glycol was copolymerized in an amount of 1 mol % with respect to all the diol components.

The resulting multilayer film reflected light having a wavelength of 900 to 1,400 nm and had a nearly reflection-free flat reflectance distribution over the wavelength region of 400 to 800 nm in the visible light range. The multilayer film had excellent transparency and excellent forming processability. Results are shown in Table 1.

Example 21

A multilayer film was obtained in the same manner as in Example 2 except that a raw material polyester resin used for forming the resin A was polyethylene naphthalate (having an intrinsic viscosity of 0.62 and a melting point of 233° C., and represented by PEN (11) in Tables) in which tetraethylene glycol was copolymerized in an amount of 20 mol % with respect to all the diol components, and that the resin B used was a copolymerized polyethylene terephthalate (having an intrinsic viscosity of 0.72 and a glass transition temperature of 53° C., being a noncrystalline resin (having no melting point), and represented by Resin (3) in Tables) in which polyethylene glycol (having an average molecular weight of 400) was copolymerized in an amount of 20 mol % with respect to ethylene glycol.

The resulting multilayer film reflected light having a wavelength of 900 to 1,400 nm and had a nearly reflection-free flat reflectance distribution over the wavelength region of 400 to 800 nm in the visible light range. The multilayer film had excellent transparency and excellent forming processability. Results are shown in Table 1.

Example 22

A multilayer film was obtained in the same manner as in Example 2 except that a raw material polyester resin used for forming the resin A was polyethylene naphthalate (having an intrinsic viscosity of 0.62 and a melting point of 218° C., and represented by PEN (12) in Tables) in which tetraethylene glycol was copolymerized in an amount of 30 mol % with respect to all the diol components, and that the resin B used was a copolymerized polyethylene terephthalate (having an intrinsic viscosity of 0.72 and a glass transition temperature of 15° C., being a noncrystalline resin (having no melting point), and represented by Resin (4) in Tables) in which polyethylene glycol (having an average molecular weight of 400) was copolymerized in an amount of 50 mol % with respect to all the diol components of the resin B.

The resulting multilayer film reflected light having a wavelength of 900 to 1,400 nm and had a nearly reflection-free flat reflectance distribution over the wavelength region of 400 to 800 nm in the visible light range. The multilayer film had excellent transparency and excellent forming processability. Results are shown in Table 1.

Comparative Example 3

A multilayer film was obtained in the same manner as in Example 1 except that a 21-layered feedblock was used for forming α layered structure of (thick surface layer of resin A)/(multi-layer unit 1 containing a total of 19 A layers and B layers layered alternately in the thickness direction)/(thick surface layer of resin A). The resulting multilayer film had a thickness of 5 μm (thick surface layer (1 μm)/multi-layer unit 1 (3 μm)/thick surface layer (1 μm)).

The resulting multilayer film had a significantly lower reflectance to light having a wavelength of 900 to 1,400 nm but had a nearly reflection-free flat reflectance distribution over the wavelength region of 400 to 800 nm in the visible light range. The multilayer film had excellent transparency and excellent forming processability. Results are shown in Table 1.

Comparative Example 4

A multilayer film was obtained in the same manner as in Example 7 except that a 21-layered feedblock was used for forming α layered structure of (thick surface layer of resin A)/(multi-layer unit 1 containing a total of 19 A layers and B layers layered alternately in the thickness direction)/(thick surface layer of resin A).

The resulting multilayer film had a significantly lower reflectance to light having a wavelength of 900 to 1,400 nm but had a nearly reflection-free flat reflectance distribution over the wavelength region of 400 to 800 nm in the visible light range. The multilayer film had excellent transparency and excellent forming processability. Results are shown in Table 1.

Comparative Example 5

A multilayer film was obtained in the same manner as in Example 2 except that a raw material polyester resin used for forming the resin A was polyethylene terephthalate (having an intrinsic viscosity of 0.65 and a melting point of 256° C., manufactured by Toray Industries, Inc., and represented by PET (1) in Tables) with respect to all the diol components.

The resulting multilayer film had a significantly lower reflectance to light having a wavelength of 900 to 1,400 nm but had a nearly reflection-free flat reflectance distribution over the wavelength region of 400 to 800 nm in the visible light range. The multilayer film had excellent transparency and excellent forming processability. Results are shown in Table 1.

Comparative Example 6

A multilayer film was obtained in the same manner as in Example 2 except that a raw material polyester resin used for forming the resin A was polyethylene terephthalate (having an intrinsic viscosity of 0.62 and a melting point of 245° C., and represented by PET(2) in Tables) in which polyethylene glycol (having a molecular weight of 400) was copolymerized in an amount of 6 mol % with respect to all the diol components.

The resulting multilayer film had a significantly lower reflectance to light having a wavelength of 900 to 1,400 nm but had a nearly reflection-free flat reflectance distribution over the wavelength region of 400 to 800 nm in the visible light range. The multilayer film had excellent transparency and excellent forming processability. Results are shown in Table 1.

Comparative Example 7

A multilayer film was obtained in the same manner as in Example 2 except that a raw material polyester resin used for forming the resin A was polyethylene terephthalate (having an intrinsic viscosity of 0.62 and a melting point of 240° C., and represented by PET(3) in Tables) in which tetraethylene glycol was copolymerized in an amount of 15 mol % with respect to all the diol components.

The resulting multilayer film had a significantly lower reflectance to light having a wavelength of 900 to 1,400 nm but had a nearly reflection-free flat reflectance distribution over the wavelength region of 400 to 800 nm in the visible light range. The multilayer film had excellent transparency and excellent forming processability. Results are shown in Table 1.

Comparative Example 8

A multilayer film was obtained in the same manner as in Example 2 except that a raw material polyester resin used for forming the resin A was polyethylene naphthalate (having an intrinsic viscosity of 0.62 and a melting point of 269° C., and represented by PEN in Tables) with respect to all the diol components.

The resulting multilayer film reflected light having a wavelength of 900 to 1,400 nm and had a nearly reflection-free flat reflectance distribution over the wavelength region of 400 to 800 nm in the visible light range. The multilayer film had excellent transparency but poor forming processability. Results are shown in Table 1.

Comparative Example 9

A multilayer film was obtained in the same manner as in Example 2 except that a raw material polyester resin used for forming the resin A was polyethylene naphthalate (having an intrinsic viscosity of 0.62 and a melting point of 265° C., and represented by PEN (13) in Tables) in which polyethylene glycol was copolymerized in an amount of 0.4 mol % with respect to all the diol components.

The resulting multilayer film reflected light having a wavelength of 900 to 1,400 nm and had a nearly reflection-free flat reflectance distribution over the wavelength region of 400 to 800 nm in the visible light range. The multilayer film had excellent transparency but poor forming processability. Results are shown in Table 1.

Comparative Example 10

A multilayer film was obtained in the same manner as in Example 2 except that a raw material polyester resin used for forming the resin A was polyethylene naphthalate (having an intrinsic viscosity of 0.62 and a melting point of 266° C., and represented by PEN (14) in Tables) in which tetraethylene glycol was copolymerized in an amount of 0.4 mol % with respect to all the diol components.

The resulting multilayer film reflected light having a wavelength of 900 to 1,400 nm and had a nearly reflection-free flat reflectance distribution over the wavelength region of 400 to 800 nm in the visible light range. The multilayer film had excellent transparency but poor forming processability. Results are shown in Table 1.

Comparative Example 11

A multilayer film was obtained in the same manner as in Example 2 except that a raw material polyester resin used for forming the resin A was polyethylene naphthalate (having an intrinsic viscosity of 0.62 and a melting point of 203° C., and represented by PEN (15) in Tables) in which polyethylene glycol was copolymerized in an amount of 40 mol % with respect to all the diol components, and that the resin B used was a copolymerized polyethylene terephthalate (having an intrinsic viscosity of 0.72 and a glass transition temperature of 15° C., being a noncrystalline resin, and represented by Resin (4) in Tables) in which polyethylene glycol (having an average molecular weight of 400) was copolymerized in an amount of 50 mol % with respect to all the diol components of the resin B.

The resulting multilayer film had a significantly lower reflectance to light having a wavelength of 900 to 1,400 nm but had a nearly reflection-free flat reflectance distribution over the wavelength region of 400 to 800 nm in the visible light range. The multilayer film had excellent transparency and excellent forming processability. Results are shown in Table 1.

Comparative Example 12

A multilayer film was obtained in the same manner as in Example 2 except that a raw material polyester resin used for forming the resin A was polyethylene naphthalate (having an intrinsic viscosity of 0.62 and a melting point of 206° C., and represented by PEN (16) in Tables) in which polyethylene glycol was copolymerized in an amount of 40 mol % with respect to all the diol components, and that the resin B used was a copolymerized polyethylene terephthalate (having an intrinsic viscosity of 0.72 and a glass transition temperature of 15° C., being a noncrystalline resin, and represented by Resin (4) in Tables) in which polyethylene glycol (having an average molecular weight of 400) was copolymerized in an amount of 50 mol % with respect to all the diol components of the resin B.

The resulting multilayer film had a significantly lower reflectance to light having a wavelength of 900 to 1,400 nm but had a nearly reflection-free flat reflectance distribution over the wavelength region of 400 to 800 nm in the visible light range. The multilayer film had excellent transparency and excellent forming processability. Results are shown in Table 1.

Comparative Example 13

A multilayer film was obtained in the same manner as in Example 2 except that a raw material polyester resin used for forming the resin A was polyethylene naphthalate (having an intrinsic viscosity of 0.62 and a melting point of 244° C., and represented by PEN (17) in Tables) in which diethylene glycol was copolymerized in an amount of 15 mol % with respect to all the diol components.

The resulting multilayer film reflected light having a wavelength of 900 to 1,400 nm and had a nearly reflection-free flat reflectance distribution over the wavelength region of 400 to 800 nm in the visible light range. The multilayer film had excellent transparency but poor forming processability. Results are shown in Table 1.

Comparative Example 14

A multilayer film was obtained in the same manner as in Example 2 except that a raw material polyester resin used for forming the resin A was polyethylene naphthalate (having an intrinsic viscosity of 0.62 and a melting point of 251° C., and represented by PEN (18) in Tables) in which butylene glycol was copolymerized in an amount of 15 mol % with respect to all the diol components.

The resulting multilayer film reflected light having a wavelength of 900 to 1,400 nm and had a nearly reflection-free flat reflectance distribution over the wavelength region of 400 to 800 nm in the visible light range. The multilayer film had excellent transparency but poor forming processability. Results are shown in Table 1.

TABLE 1

| | Resin A | | Resin B | | Chemical Compound having Formula (1) | | Film Properties | |
|---|---|---|---|---|---|---|---|---|
| | Main Component | Copolymerization Component | Main Component | Copolymerization Component | $m \times n$ | Content in Laminated Structure Part (mol %) | Laminated Layer Numbers | Average Reflectance (400 to 800 nm) % |
| Example 1 | PEN (1) | Polyethylene glycol | Resin (1) | CHDM | 10 or more | 3 | 449 | 11 |
| Example 2 | PEN (1) | | Resin (1) | CHDM | 10 or more | 3 | 51 | 10 |
| Example 3 | PEN (2) | Polytetramethylene ether glycol | Resin (1) | CHDM | 10 or more | 3 | 449 | 11 |
| Example 4 | PEN (2) | | Resin (1) | CHDM | 10 or more | 3 | 51 | 10 |
| Example 5 | PEN (3) | Triethylene glycol | Resin (1) | CHDM | 6 | 7.5 | 449 | 10 |
| Example 6 | PEN (3) | | Resin (1) | CHDM | 6 | 7.5 | 51 | 10 |
| Example 7 | PEN (4) | Tetraethylene glycol | Resin (1) | CHDM | 8 | 7.5 | 449 | 10 |
| Example 8 | PEN (4) | | Resin (1) | CHDM | 8 | 7.5 | 51 | 10 |
| Example 9 | PEN (5) | Dipropylene glycol | Resin (1) | CHDM | 6 | 7.5 | 449 | 10 |
| Example 10 | PEN (5) | | Resin (1) | CHDM | 6 | 7.5 | 51 | 10 |
| Example 11 | PEN (6) | Tripropylene glycol | Resin (1) | CHDM | 9 | 7.5 | 449 | 10 |
| Example 12 | PEN (6) | | Resin (1) | CHDM | 9 | 7.5 | 51 | 10 |

| | Film Properties | | | | | | |
|---|---|---|---|---|---|---|---|
| | Average Reflectance (900 to 1400 nm) % | Reflectance Bandwidth showing Reflectance of 30% or more nm | Critical Load in Scratch Test mN | Peak Value of Loss Tangent ° C. | Refractive Index of Film Surface | Internal Haze % | Forming Processability |
| Example 1 | 81 | 900-1400 | 9 | 93 | 1.72 | 0.8 | Excellent |
| Example 2 | 40 | 900-1330 | 9 | 93 | 1.72 | 0.6 | Excellent |
| Example 3 | 75 | 900-1400 | 8 | 87 | 1.72 | 0.9 | Excellent |
| Example 4 | 35 | 900-1300 | 8 | 87 | 1.72 | 0.6 | Excellent |
| Example 5 | 82 | 900-1400 | 11 | 105 | 1.71 | 0.3 | good |
| Example 6 | 39 | 900-1260 | 11 | 105 | 1.71 | 0.2 | good |
| Example 7 | 76 | 900-1400 | 10 | 97 | 1.72 | 0.3 | Excellent |
| Example 8 | 35 | 900-1280 | 10 | 97 | 1.72 | 0.2 | Excellent |
| Example 9 | 83 | 900-1400 | 12 | 109 | 1.72 | 0.3 | good |
| Example 10 | 42 | 900-1310 | 12 | 109 | 1.72 | 0.2 | good |
| Example 11 | 79 | 900-1370 | 10 | 100 | 1.70 | 0.3 | Excellent |
| Example 12 | 38 | 900-1290 | 10 | 100 | 1.70 | 0.2 | Excellent |

TABLE 2

| | Resin A | | Resin B | | Chemical Compound having Formula (1) | | Laminated Layer Numbers | Film Properties Average Reflectance (400 to 800 nm) % |
|---|---|---|---|---|---|---|---|---|
| | Main Component | Copolymerization Component | Main Component | Copolymerization Component | m × n | Content in Laminated Structure Part (mol %) | | |
| Example 13 | PEN (1) | Polyethylene glycol | Resin (2) | CHDA, SPG | 10 or more | 3 | 449 | 11 |
| Example 14 | PEN (1) | Polyethylene glycol | Resin (2) | CHDA, SPG | 10 or more | 3 | 51 | 10 |
| Example 15 | PEN (4) | Tetraethylene glycol | Resin (2) | CHDA, SPG | 8 | 7.5 | 449 | 11 |
| Example 16 | PEN (4) | Tetraethylene glycol | Resin (2) | CHDA, SPG | 8 | 7.5 | 51 | 10 |
| Example 17 | PEN (5) | Polyethylene glycol | Resin (1) | CHDM | 10 or more | 2 | 51 | 10 |
| Example 18 | PEN (6) | Polyethylene glycol | Resin (1) | CHDM | 10 or more | 0.5 | 51 | 10 |
| Example 19 | PEN (7) | | Resin (3) | PEG400 | 10 or more | 20 | 51 | 10 |
| Example 20 | PEN (8) | | Resin (4) | PEG400 | 10 or more | 40 | 51 | 10 |
| Comparative Example 1 | PEN (9) | Tetraethylene glycol | Resin (1) | CHDM | 8 | 2 | 51 | 10 |
| Comparative Example 2 | PEN (10) | | Resin (1) | CHDM | 8 | 0.5 | 51 | 10 |
| Example 21 | PEN (11) | | Resin (3) | PEG400 | 8 | 20 | 51 | 10 |
| Example 22 | PEN (12) | | Resin (4) | PEG400 | 8 | 40 | 51 | 10 |

| | Film Properties | | | | | | |
|---|---|---|---|---|---|---|---|
| | Average Reflectance (900 to 1400 nm) % | Reflectance Bandwidth showing Reflectance of 30% or more nm | Critical Load in Scratch Test mN | Peak Value of Loss Tangent ° C. | Refractive Index of Film Surface | Internal Haze % | Forming Processability |
| Example 13 | 84 | 900-1400 | 9 | 93 | 1.72 | 0.8 | Excellent |
| Example 14 | 46 | 900-1290 | 9 | 93 | 1.72 | 0.6 | Excellent |
| Example 15 | 80 | 900-1400 | 10 | 97 | 1.72 | 0.4 | Excellent |
| Example 16 | 40 | 900-1275 | 10 | 97 | 1.72 | 0.2 | Excellent |
| Example 17 | 40 | 900-1240 | 10 | 96 | 1.72 | 0.6 | Excellent |
| Example 18 | 43 | 900-1230 | 12 | 109 | 1.73 | 0.4 | good |
| Example 19 | 39 | 900-1190 | 9 | 92 | 1.70 | 1.4 | Excellent |
| Example 20 | 33 | 900-1060 | 8 | 86 | 1.69 | 1.1 | Excellent |
| Comparative Example 1 | 41 | 900-1100 | 16 | 115 | 1.73 | 0.3 | bad |
| Comparative Example 2 | 42 | 900-1130 | 17 | 117 | 1.73 | 0.2 | worse |
| Example 21 | 38 | 900-1160 | 9 | 92 | 1.70 | 0.5 | Excellent |
| Example 22 | 35 | 900-1060 | 7 | 84 | 1.68 | 0.9 | Excellent |

TABLE 3

| | Resin A | | Resin B | | Chemical Compound having Formula (1) | | Laminated Layer Numbers | Film Properties Average Reflectance (400 to 800 nm) % |
|---|---|---|---|---|---|---|---|---|
| | Main Component | Copolymerization Component | Main Component | Copolymerization Component | m × n | Content in Laminated Structure Part (mol %) | | |
| Comparative Example 3 | PEN (1) | Polyethylene glycol | Resin (1) | CHDM | 10 or more | 3 | 21 | 10 |
| Comparative Example 4 | PEN (4) | Tetraethylene glycol | Resin (1) | CHDM | 8 | 7.5 | 21 | 10 |
| Comparative Example 5 | PET (1) | — | Resin (1) | CHDM | 2 | 0 | 51 | 9 |
| Comparative Example 6 | PET (2) | Polyethylene glycol | Resin (1) | CHDM | 10 or more | 3 | 51 | 9 |
| Comparative Example 7 | PET (3) | Tetraethylene glycol | Resin (1) | CHDM | 8 | 7.5 | 51 | 9 |
| Comparative Example 8 | PEN | — | Resin (1) | CHDM | 2 | 0 | 51 | 11 |
| Comparative Example 9 | PEN (13) | Polyethylene glycol | Resin (1) | CHDM | 10 or more | 0.2 | 51 | 10 |

TABLE 3-continued

| | | | | | | | | |
|---|---|---|---|---|---|---|---|---|
| Comparative Example 10 | PEN (14) | Tetraethylene glycol | Resin (1) | CHDM | 8 | 0.2 | 51 | 11 |
| Comparative Example 11 | PEN (15) | Polyethylene glycol | Resin (4) | PEG400 | 10 or more | 45 | 51 | 10 |
| Comparative Example 12 | PEN (16) | Tetraethylene glycol | Resin (4) | PEG400 | 8 | 45 | 51 | 10 |
| Comparative Example 13 | PEN (17) | Diethylene glycol | Resin (1) | CHDM | 4 | 0 | 51 | 12 |
| Comparative Example 14 | PEN (18) | Buthylene glycol | Resin (1) | CHDM | 4 | 0 | 51 | 14 |

| | Film Properties | | | | | | |
|---|---|---|---|---|---|---|---|
| | Average Reflectance (900 to 1400 nm) % | Reflectance Bandwidth showing Reflectance of 30% or more nm | Critical Load in Scratch Test mN | Peak Value of Loss Tangent ° C. | Refractive Index of Film Surface — | Internal Haze % | Forming Processability |
| Comparative Example 3 | 21 | 900-910 | 9 | 93 | 1.72 | 0.4 | Excellent |
| Comparative Example 4 | 18 | 900-910 | 10 | 98 | 1.72 | 0.1 | Excellent |
| Comparative Example 5 | 20 | 900-915 | 8 | 83 | 1.66 | 0.1 | Excellent |
| Comparative Example 6 | 17 | — | 5 | 69 | 1.59 | 0.4 | Excellent |
| Comparative Example 7 | 15 | — | 5 | 72 | 1.58 | 0.2 | Excellent |
| Comparative Example 8 | 45 | 900-1205 | 18 | 124 | 1.75 | 0.5 | worse |
| Comparative Example 9 | 41 | 900-1160 | 16 | 115 | 1.73 | 0.5 | bad |
| Comparative Example 10 | 39 | 900-1100 | 18 | 122 | 1.73 | 0.4 | worse |
| Comparative Example 11 | 20 | 900-910 | 7 | 80 | 1.65 | 0.8 | Excellent |
| Comparative Example 12 | 21 | 900-915 | 5 | 76 | 1.67 | 0.6 | Excellent |
| Comparative Example 13 | 36 | 900-1120 | 16 | 116 | 1.72 | 2.2 | bad |
| Comparative Example 14 | 40 | 900-1120 | 17 | 121 | 1.73 | 3.1 | worse |

The present invention is used in various applications including building materials, automobiles, and liquid crystal displays, and in particular, it can be used as optical film to reflect light in a specific wavelength range.

REFERENCE SIGNS LIST

1 Region A
2 Region B
3 Region C
4 Point at which the slope of the sensor acceleration is the largest in the depth direction
5 Value of load applied at the point at which the slope of the sensor acceleration is the largest in the depth direction: critical load (mN) Wc

The invention claimed is:
1. A multilayer film comprising a multi-layer structure unit which is a 51-layered or more multiple layer formed by alternately layering a layer (A layer) a main component of which is a polyester resin (resin A) having a dicarboxylic component and a diol component, and a layer (B layer) a main component of which is a thermoplastic resin (resin B) different from the resin A in optical properties;
wherein said A layer is arranged as at least one surface layer of said multi-layer structure unit,
wherein the layer A arranged as at least one surface of said multi-layer structure unit has a refractive index of 1.68 or more and 1.80 or less,
wherein the layer A arranged as at least one surface of said multi-layer structure unit has a critical load of 15 mN or less at 100° C. in a scratch test,
wherein said multilayer film has at least one reflection bandwidth having a reflectance of 30% or more continuous over a wavelength width of 20 nm or more in a profile of reflectance measured on the layer A arranged as at least one surface side of said multi-layer structure unit, and
wherein said resin A is a polyethylene naphthalate copolymerized with a diol component, having a structure represented by the formula (1):

—O—($C_nH_{2n}$—O)$_m$—            formula (1)

wherein at least one diol component of resin A is selected from the group of polyethylene glycol, tetraethylene glycol, polytetramethyleneether glycal, triethylene glycol, dipropylene glycol, tripropylene glycol, tetrapropylene glycol, tributylene glycol, and tetrabutylene glycol,
wherein when the diol component of resin A is polyethylene glycol, polytetramethyleneether glycol, tetrapropylene glycol, tributylene glycol, or tetrabutylene glycol, the diol component is present in an amount of 0.5 mol % or more and 40 mol % or less with respect to all the diol components of said resin A, wherein when the diol component of resin A is tetraethylene glycol, triethylene glycol, dipropylene glycol, tripropylene glycol, the did component is present in an amount of 5 mol % or more and 40 mol % or less with respect to all the diol components of said resin A, and wherein said resin B is a noncrystalline co-polyester resin derived from a dicarboxylic component comprising terephthalic acid, a diol component comprising ethylene glycol, and a comonomer selected from the group consisting of cyclohexane dimethanol, cyclohexanedicarboxylic acid, spiroglycol and polyethylene glycol.

2. The multilayer film according to claim 1, wherein said profile of reflectance is measured over the wavelength region of 900 to 1,400 nm.

3. The multilayer film according to claim 1, wherein said multi-layer structure unit has a peak value of loss tangent (tan δ), determined by dynamic viscoelasticity measurement, of 120° C. or less.

4. The multilayer film according to claim 1, wherein said resin B further contains, as a diol component, a structure represented by the formula (1):

   formula (1)

wherein m and n are natural numbers so that m×n is 5 or more and m is 2 or more.

5. The multilayer film according to claim 1, wherein said resin B further contains, as a diol component, a structure represented by the formula (1) in an amount of 0.5 mol % or more and 40 mol % or less with respect to all the diol components;

   formula (1)

wherein m and n are natural numbers so that m×n is 5 or more and m is 2 or more.

6. The multilayer film according to claim 1, wherein said multi-layer structure unit has a multi-layer unit 1 and a multi-layer unit 2;

wherein said multi-layer unit 1 is formed by alternately layering a layer (α layer) a main component of which is a polyester resin α having a dicarboxylic component and a diol component, and a layer (β layer) a main component of which is a thermoplastic resin β different from said resin α in optical properties, and said multi-layer unit 1 satisfies the following (i);

wherein said multi-layer unit 2 is formed by alternately layering a layer (γ layer) a main component of which is a polyester resin γ having a dicarboxylic component and a diol component, and a layer (ω layer) a main component of which is a thermoplastic resin ω different from said resin γ in optical properties, and said multi-layer unit 2 satisfies the following (ii):

(i) any α layer and a β layer located adjacent to each other have a thickness ratio (thickness of α layer/thickness of β layer) of 0.7 or more and 1.4 or less;

(ii) compared to the thinnest layer, having a thickness L1, of three layers located adjacent to each other, one of the other two layers has a thickness L2 and a thickness ratio (L2/L1) of 1.0 or more and 1.4 or less whereas the remaining layer has a thickness L3 and a thickness ratio (L3/L1) of 5 or more and 9 or less, wherein the polyester resins α and γ refer to the polyester resin A and the thermoplastic resins β and ω refer to the thermoplastic resin B.

7. A multilayer film comprising a multi-layer structure unit which is a 51-layered or more multiple layer formed by alternately layering a layer (A layer) a main component of which is a polyester resin (resin A) having a dicarboxylic component and a diol component, and a layer (B layer) a main component of which is a thermoplastic resin (resin B) different from the resin A in optical properties;

wherein said A layer is arranged at least one surface layer of said multi-layer structure unit, wherein said multilayer film has at least one reflection bandwidth having a reflectance of 30% or more continuous over a width of 20 nm or more, said reflectance being measured on said A layer arranged as at least one surface side of said multi-layer structure unit, and wherein said A layer arranged as at least one surface of said multi-layer structure unit has a refractive index of 1.68 or more and 1.80 or less, wherein said resin A is a polyethylene naphthalate copolymerized with a diol component, having a structure represented by the formula (1):

   formula (1)

wherein at least one diol component of resin A is selected from the group of polyethylene glycol, tetraethylene glycol, polytetramethyleneether glycol, triethylene glycol, dipropylene glycol, tripropylene glycol, tetrapropylene glycol, tributylene glycol, and tetrabutylene glycol, wherein when the diol component of resin A is polyethylene glycal, polytetramethyleneether glycol, tetrapropylene glycal, tributylene glycol, or tetrabutylene glycol, the diol component is present in an amount of 0.5 mol % or more and 40 mol % or less with respect to all the diol components of said resin A, wherein when the diol component of resin A is tetraethylene glycol, triethylene glycol, dipropylene glycol, tripropylene glycol, the diol component is present in an amount of 5 mol % or more and 40 mol % or less with respect to all the diol components of said resin A, and wherein said resin B is a noncrystalline co-polyester resin derived from a dicarboxylic component comprising terephthalic acid, a diol component comprising ethylene glycol, and a comonomer selected from the group consisting of cyclohexane dimethanol, cyclohexanedicarboxylic acid, spiroglycol and polyethylene glycol.

8. The multilayer film according to claim 7, wherein said resin B further contains, as a diol component, a structure represented by the formula (1):

   formula (1)

wherein m and n are natural numbers so that m×n is 5 or more and m is 2 or more.

9. The multilayer film according to claim 7, wherein said resin B further contains, as a diol component, a structure represented by the formula (1) in an amount of 0.5 mol % or more and 40 mol % or less with respect to all the did components;

   formula (1)

wherein m and n are natural numbers so that m×n is 5 or more and m is 2 or more.

10. The multilayer film according to claim 7, wherein said multilayer film has at least one reflection bandwidth having a reflectance of 30% or more continuous over a wavelength width of 20 nm or more in a profile of reflectance measured on at least one surface side of said multi-layer structure unit, and wherein said profile of reflectance is measured over the wavelength region of 900 to 1,400 nm.

11. The multilayer film according to claim 7, wherein said multi-layer structure unit has a peak value of loss tangent (tan δ) determined by dynamic viscoelasticity measurement, of 120° C. or less.

12. The multilayer film according to claim 7, wherein said multi-layer structure unit has a multi-layer unit 1 and a multi-layer unit 2;
- wherein said multi-layer unit 1 is formed by alternately layering a layer (α layer) a main component of which is a polyester resin α having a dicarboxylic component and a diol component, and a layer (β layer) a main component of which is a thermoplastic resin β different from the resin α in optical properties, and said multi-layer unit 1 satisfies the following (i);
- wherein said multi-layer unit 2 is formed by alternately layering a layer (γ layer) a main component of which is a polyester resin γ having a dicarboxylic component and a diol component, and a layer (ω layer) a main component of which is a thermoplastic resin ω different from the resin γ in optical properties, and said multi-layer unit 2 satisfies the following (ii):
- (i) any α layer and a β layer located adjacent to each other have a thickness ratio (thickness of α layer/thickness of β layer) of 0.7 or more and 1.4 or less;
- (ii) compared to the thinnest layer, having a thickness L1, of three layers located adjacent to each other, one of the other two layers has a thickness L2 and a thickness ratio (L2/L1) of 1.0 or more and 1.4 or less whereas the remaining layer has a thickness L3 and a thickness ratio (L3/L1) of 5 or more and 9 or less,
- wherein the polyester resins α and γ refer to the polyester resin A and the thermoplastic resins β and ω refer to the thermoplastic resin B.

\* \* \* \* \*

UNITED STATES PATENT AND TRADEMARK OFFICE
CERTIFICATE OF CORRECTION

PATENT NO. : 11,760,072 B2
APPLICATION NO. : 16/650653
DATED : September 19, 2023
INVENTOR(S) : Yoshihiro Masuda It is certified that error appears in the above-identified patent and that said Letters Patent is hereby corrected as shown below:

In the Claims

In Claim 1, Column 32, Line 60, "polytetramethyleneether glycal" should read
-- polytetramethyleneether glycol --

In Claim 1, Column 35, Line 5, "the did component" should read -- the diol component --

Signed and Sealed this
Twenty-third Day of January, 2024

Katherine Kelly Vidal
*Director of the United States Patent and Trademark Office*